United States Patent
Jayaraman et al.

(10) Patent No.: US 11,029,947 B2
(45) Date of Patent: Jun. 8, 2021

(54) UTILIZING ARTIFICIAL INTELLIGENCE TO IMPROVE PRODUCTIVITY OF SOFTWARE DEVELOPMENT AND INFORMATION TECHNOLOGY OPERATIONS (DEVOPS)

(71) Applicant: Accenture Global Solutions Limited, Dublin (IE)

(72) Inventors: Sundar Prasad Jayaraman, Bengaluru (IN); Ravindra Kabbinale, Bangalore (IN); Suhas Nagaraju, Bangalore (IN); Amrutha Pervody Bhat, Bangalore (IN); Smitha Ka, Bangalore District (IN); Divya R. Purushotham, Bangalore (IN); Sanjay Singatalur, Bengaluru (IN); Vijeth Srinivas Hegde, Bangalore (IN); Aditi Kulkarni, Bengaluru (IN); Rajendra T. Prasad, Basking Ridge, NJ (US); Koushik M Vijayaraghavan, Chennai (IN)

(73) Assignee: Accenture Global Solutions Limited, Dublin (IE)

( * ) Notice: Subject to any disclaimer, the term of this patent is extended or adjusted under 35 U.S.C. 154(b) by 54 days.

(21) Appl. No.: 16/557,588

(22) Filed: Aug. 30, 2019

(65) Prior Publication Data

US 2021/0064361 A1     Mar. 4, 2021

(51) Int. Cl.
*G06F 8/71*     (2018.01)
*G06N 20/10*    (2019.01)
(Continued)

(52) U.S. Cl.
CPC .......... *G06F 8/71* (2013.01); *G06F 8/10* (2013.01); *G06F 17/15* (2013.01); *G06F 17/16* (2013.01);
(Continued)

(58) Field of Classification Search
CPC .......... H04L 51/02; G06N 20/10; G06N 3/08; G06F 17/15; G06F 17/16; G06F 8/10; G06F 8/71
(Continued)

(56) References Cited

U.S. PATENT DOCUMENTS 10,576,380 B1 *   3/2020  Beltran ............... A63F 13/67
2017/0212829 A1 * 7/2017  Bales ................ G06F 11/3612
(Continued)

FOREIGN PATENT DOCUMENTS

EP    3388986 A1    10/2018
EP    3483797 A1    5/2019

OTHER PUBLICATIONS

Extended European Search Report for Application No. EP20193081.5, dated Feb. 9, 2021, 11 pages.

*Primary Examiner* — Marina Lee
(74) *Attorney, Agent, or Firm* — Harrity & Harrity, LLP

(57) ABSTRACT

A device may receive data associated with a software development platform, and may correlate the data to generate correlated data. The device may train a first model, with the correlated data, to generate a software impact analyzer model, and may train a second model, with the correlated data, to generate a software development behavior model. The device may receive data identifying a new software requirement associated with the software development platform, and may process the data identifying the new software requirement, with the software impact analyzer model, to identify a file or a module impacted by the new software requirement. The device may process data identifying the file or the module, with the software development behavior model, to identify a developer to handle the new
(Continued)

software requirement, and may perform one or more actions based on the data identifying the file or the module and data identifying the developer.

20 Claims, 16 Drawing Sheets

(51) Int. Cl.
| | |
|---|---|
| *G06F 8/10* | (2018.01) |
| *G06F 17/15* | (2006.01) |
| *G06F 17/16* | (2006.01) |
| *G06N 3/08* | (2006.01) |
| *H04L 12/58* | (2006.01) |

(52) U.S. Cl.
CPC .............. *G06N 3/08* (2013.01); *G06N 20/10* (2019.01); *H04L 51/02* (2013.01)

(58) Field of Classification Search
USPC .................................................. 717/100–124
See application file for complete search history.

(56) References Cited

U.S. PATENT DOCUMENTS

| | | | |
|---|---|---|---|
| 2019/0114420 A1* | 4/2019 | Chistyakov | G06F 21/564 |
| 2019/0147371 A1 | 5/2019 | Deo et al. | |
| 2019/0180195 A1* | 6/2019 | Terry | G06F 16/34 |
| 2019/0317885 A1* | 10/2019 | Heinecke | G06F 11/3447 |
| 2020/0159525 A1* | 5/2020 | Bhalla | G06N 5/02 |
| 2020/0210577 A1* | 7/2020 | Chistyakov | G06F 21/554 |
| 2020/0293495 A1* | 9/2020 | Balachandran | G06F 16/128 |
| 2020/0371851 A1* | 11/2020 | Liu | G06N 20/00 |
| 2021/0064361 A1* | 3/2021 | Jayaraman | G06N 20/10 |

* cited by examiner

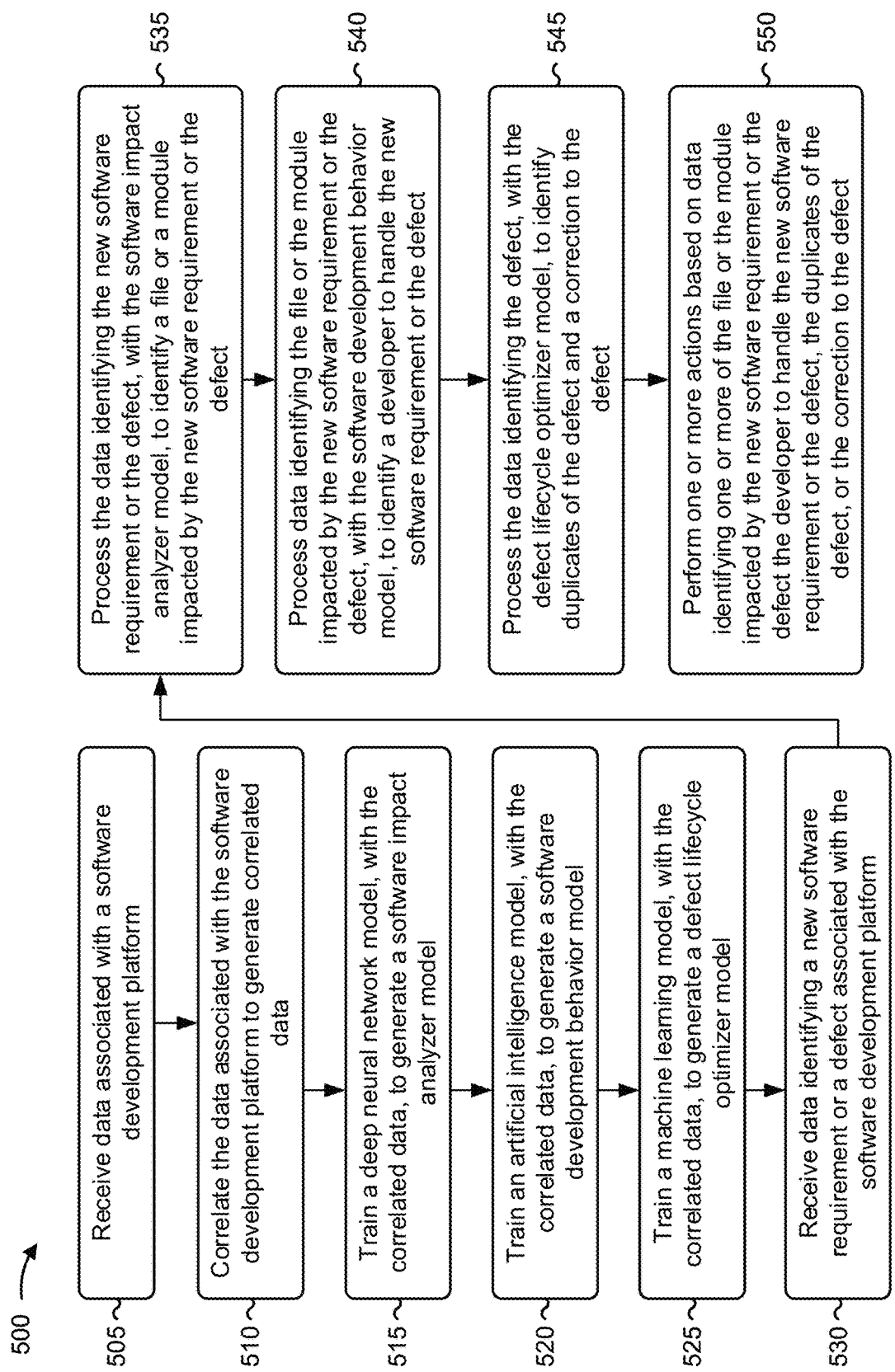

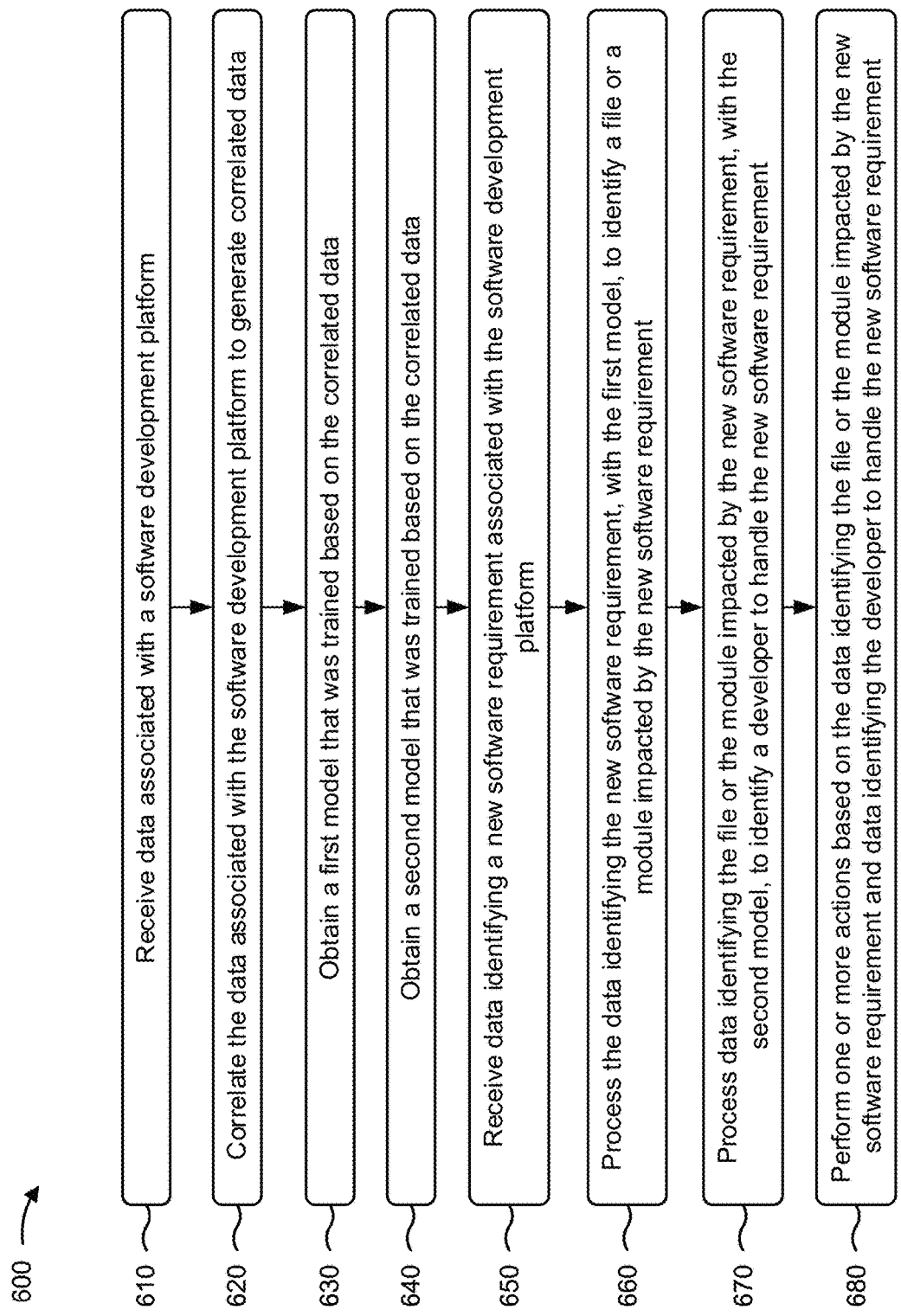

US 11,029,947 B2

UTILIZING ARTIFICIAL INTELLIGENCE TO IMPROVE PRODUCTIVITY OF SOFTWARE DEVELOPMENT AND INFORMATION TECHNOLOGY OPERATIONS (DEVOPS)

BACKGROUND

Software development and information technology operations (DevOps) may be utilized to shorten a software development life cycle while delivering features, fixes, updates, and/or the like in close alignment with business objectives.

SUMMARY

According to some implementations, a method may include receiving data associated with a software development platform, and correlating the data associated with the software development platform to generate correlated data. The method may include training a deep neural network model, with the correlated data, to generate a software impact analyzer model, and training an artificial intelligence model, with the correlated data, to generate a software development behavior model. The method may include receiving data identifying a new software requirement or a defect associated with the software development platform, and processing the data identifying the new software requirement or the defect, with the software impact analyzer model, to identify a file or a module impacted by the new software requirement or the defect. The method may include processing data identifying the file or the module impacted by the new software requirement or the defect, with the software development behavior model, to identify a developer to handle the new software requirement or the defect, and performing one or more actions based on the data identifying the file or the module impacted by the new software requirement or the defect, and data identifying the developer to handle the new software requirement or the defect.

According to some implementations, a device may include one or more memories, and one or more processors, communicatively coupled to the one or more memories, to receive data associated with a software development platform, and correlate the data associated with the software development platform to generate correlated data. The one or more processors may train a deep neural network model, with the correlated data, to generate a software impact analyzer model, and may train an artificial intelligence model, with the correlated data, to generate a software development behavior model. The one or more processors may train a machine learning model, with the correlated data, to generate a defect lifecycle optimizer model, and may receive data identifying a new software requirement or a defect associated with the software development platform. The one or more processors may process the data identifying the new software requirement or the defect, with the software impact analyzer model, to identify a file or a module impacted by the new software requirement or the defect, and may process data identifying the file or the module impacted by the new software requirement or the defect, with the software development behavior model, to identify a developer to handle the new software requirement or the defect. The one or more processors may process the data identifying the defect, with the defect lifecycle optimizer model, to identify duplicates of the defect and a correction to the defect, and may perform one or more actions based on data identifying one or more of: the file or the module impacted by the new software requirement or the defect, the developer to handle the new software requirement or the defect, the duplicates of the defect, or the correction to the defect.

According to some implementations, a non-transitory computer-readable medium may store one or more instructions that, when executed by one or more processors of a device, may cause the one or more processors to receive data associated with a software development platform, and correlate the data associated with the software development platform to generate correlated data. The one or more instructions may cause the one or more processors to obtain a first model that was trained based on the correlated data, and obtain a second model that was trained based on the correlated data. The one or more instructions may cause the one or more processors to receive data identifying a new software requirement associated with the software development platform, and process the data identifying the new software requirement, with the first model, to identify a file or a module impacted by the new software requirement. The one or more instructions may cause the one or more processors to process data identifying the file or the module impacted by the new software requirement, with the second model, to identify a developer to handle the new software requirement, and perform one or more actions based on the data identifying the file or the module impacted by the new software requirement and data identifying the developer to handle the new software requirement.

BRIEF DESCRIPTION OF THE DRAWINGS

FIGS. 4-6 are flow charts of example processes for utilizing artificial intelligence to improve productivity of software development and information technology operations.

DETAILED DESCRIPTION

Figure 1A:
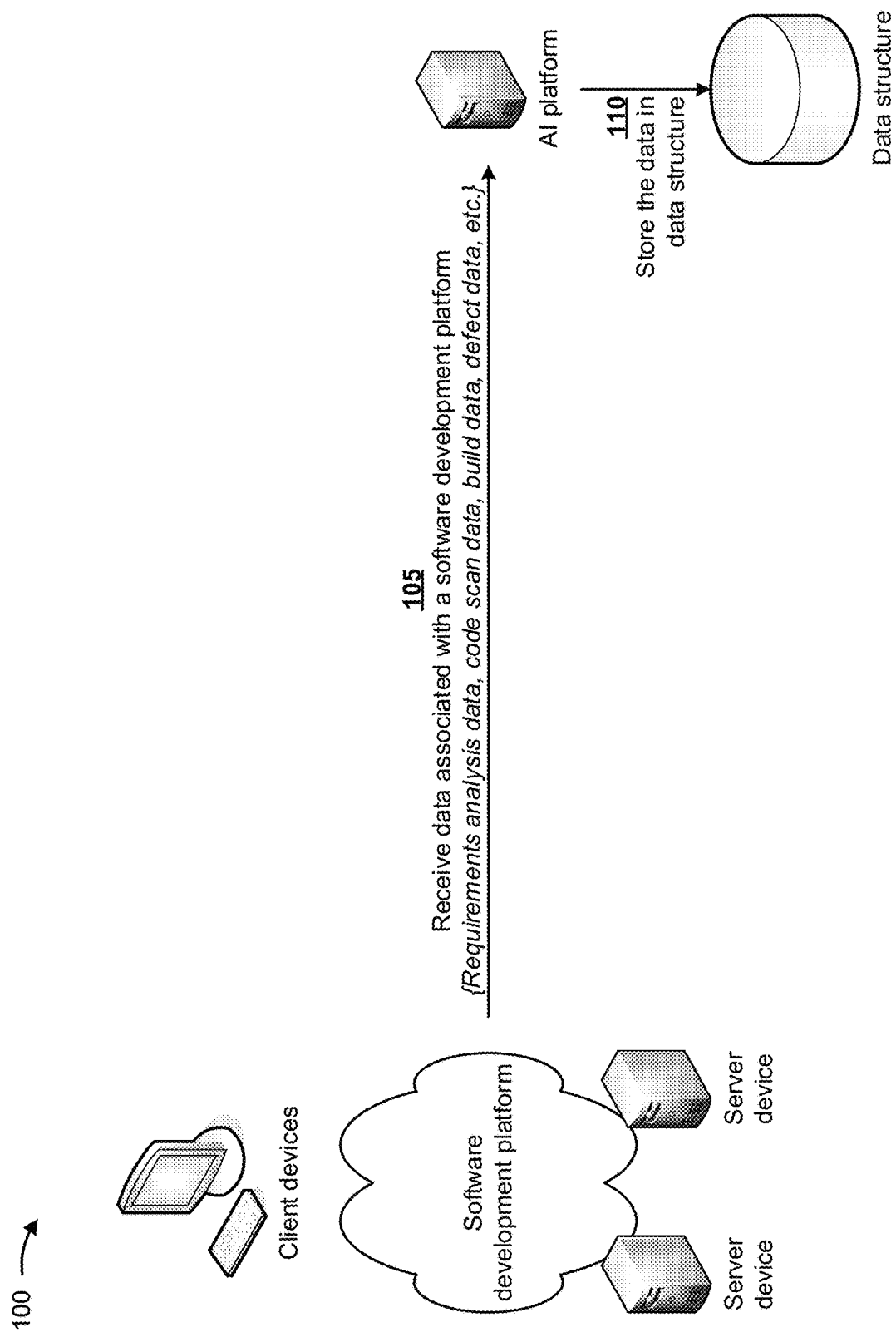
FIGS. 1A-1K are diagrams of one or more example implementations described herein.

The following detailed description of example implementations refers to the accompanying drawings. The same reference numbers in different drawings may identify the same or similar elements.

Software development and information technology operations may be implemented by a software development platform. The software development platform may include tools for software coding (e.g., code development and review, source code management tools, code merging, and/or the like); software building (e.g., continuous integration tools, build status, and/or the like); software testing (e.g., continuous testing tools that provide quick and timely feedback on business risks); software packaging (e.g., artifact repository, application pre-deployment staging, and/or the like); software releasing (e.g., change management, release approvals, release automation, and/or the like); software configuring (e.g., infrastructure configuration and management, infrastructure as code tools, and/or the like); software monitoring (e.g., applications performance monitoring, end-user experience, and/or the like); and/or the like.

However, such tools operate in silos and do not share information. For example, there is no standard metadata associated with various tools, the tools do not include mechanisms to collaborate with other tools and/or to pull/push data among the tools, the traceability of data across the tools is highly challenging and is manual, and/or the like. This wastes computing resources (e.g., processing resources, memory resources, and/or the like), networking resources, and/or the like associated with utilizing such tools since information from one tool may reduce resource usage of another tool. Furthermore, computing resources, networking resources, and/or the like are wasted selecting software developers to handle new software requirements and/or defects, identifying corrections for defects, and/or like.

Some implementations described herein provide an artificial intelligence platform that utilizes artificial intelligence to improve productivity of software development and information technology operations. For example, the artificial intelligence platform may receive data associated with a software development platform, and may correlate the data associated with the software development platform to generate correlated data. The artificial intelligence platform may train a deep neural network model, with the correlated data, to generate a software impact analyzer model, and may train an artificial intelligence model, with the correlated data, to generate a software development behavior model. The artificial intelligence platform may train a machine learning model, with the correlated data, to generate a defect lifecycle optimizer model, and may receive data identifying a new software requirement or a defect associated with the software development platform. The artificial intelligence platform may process the data identifying the new software requirement or the defect, with the software impact analyzer model, to identify a file or a module impacted by the new software requirement or the defect, and may process data identifying the file or the module impacted by the new software requirement or the defect, with the software development behavior model, to identify a developer to handle the new software requirement or the defect. The artificial intelligence platform may process the data identifying the defect, with the defect lifecycle optimizer model, to identify duplicates of the defect and a correction to the defect, and may perform one or more actions based on data identifying the file or the module impacted by the new software requirement or the defect, the developer to handle the new software requirement or the defect, the duplicates of the defect, or the correction to the defect.

In this way, productivity may be improved for a software development platform that includes tools for software coding, software building, software testing, software packaging, software releasing, software configuring, and/or software monitoring. This, in turn, conserves computing resources (e.g., processing resources, memory resources, and/or the like), networking resources, and/or the like that would otherwise be wasted inefficiently utilizing such tools, selecting software developers to handle new software requirements and/or defects, identifying corrections for defects, and/or like.

FIGS. 1A-1K are diagrams of one or more example implementations 100 described herein. As shown in FIG. 1A, example implementation 100 may include a software development platform, an artificial intelligence platform, and a data structure. The software development platform may be hosted by a cloud computing environment or by one or more server devices, and may be associated with one or more client devices. The artificial intelligence platform may be associated with the software development platform, the data structure, and/or one or more client devices.

As further shown in FIG. 1A, and by reference number 105, the artificial intelligence platform may receive, from the software development platform, data associated with the software development platform. The data associated with the software development platform may include data generated by a number of different software development tools associated with the software development platform. For example, the data associated with the software development platform may include software coding data generated by a software coding tool, software building data generated by a software building tool, software testing and test results data generated by a software testing tool, software packaging data generated by a software packaging tool, software release data generated by a software releasing tool, software configuration data generated by a software configuring tool, software monitoring data generated by a software monitoring tool, software requirements analysis data, code scan data, software build data (e.g., data identifying code that passed or failed unit testing, a priority status for each testing, and/or the like), software defect data, code quality analyzer data (e.g., data indicating how many times a developer checked in code, a quantity of violations in each check-in for each module, a priority of standard violations, and/or the like), and/or the like.

In some implementations, the artificial intelligence platform may extract the data associated with the software development platform from software development logs associated with the software development tools. For example, the artificial intelligence platform may employ webhooks to obtain the data associated with the software development platform from the software development tools. More specifically, the artificial intelligence platform may employ Python webhooks that scan the software development logs associated with each of the software development tools to identify relevant information.

As further shown in FIG. 1A, and by reference number 110, the artificial intelligence platform may store the data associated with the software development platform in a data structure (e.g., a database, a table, a list, and/or the like). In one example, the data structure may include a data repository (e.g., a data lake) that stores the data associated with the software development tools. The data structure may store the data associated with the software development platform based on the different software development logs corresponding to the different software development tools. The data associated with the software development platform may be unstructured data in which data generated by one tool is native to that tool and does not have a same format as data generated by another tool (e.g., there are no standard metadata associated with the various tools). For example, the data associated with each software development tool may be associated with differently arranged logs, different fields, different variable definitions, different data formats, and/or the like.

Figure 1B:
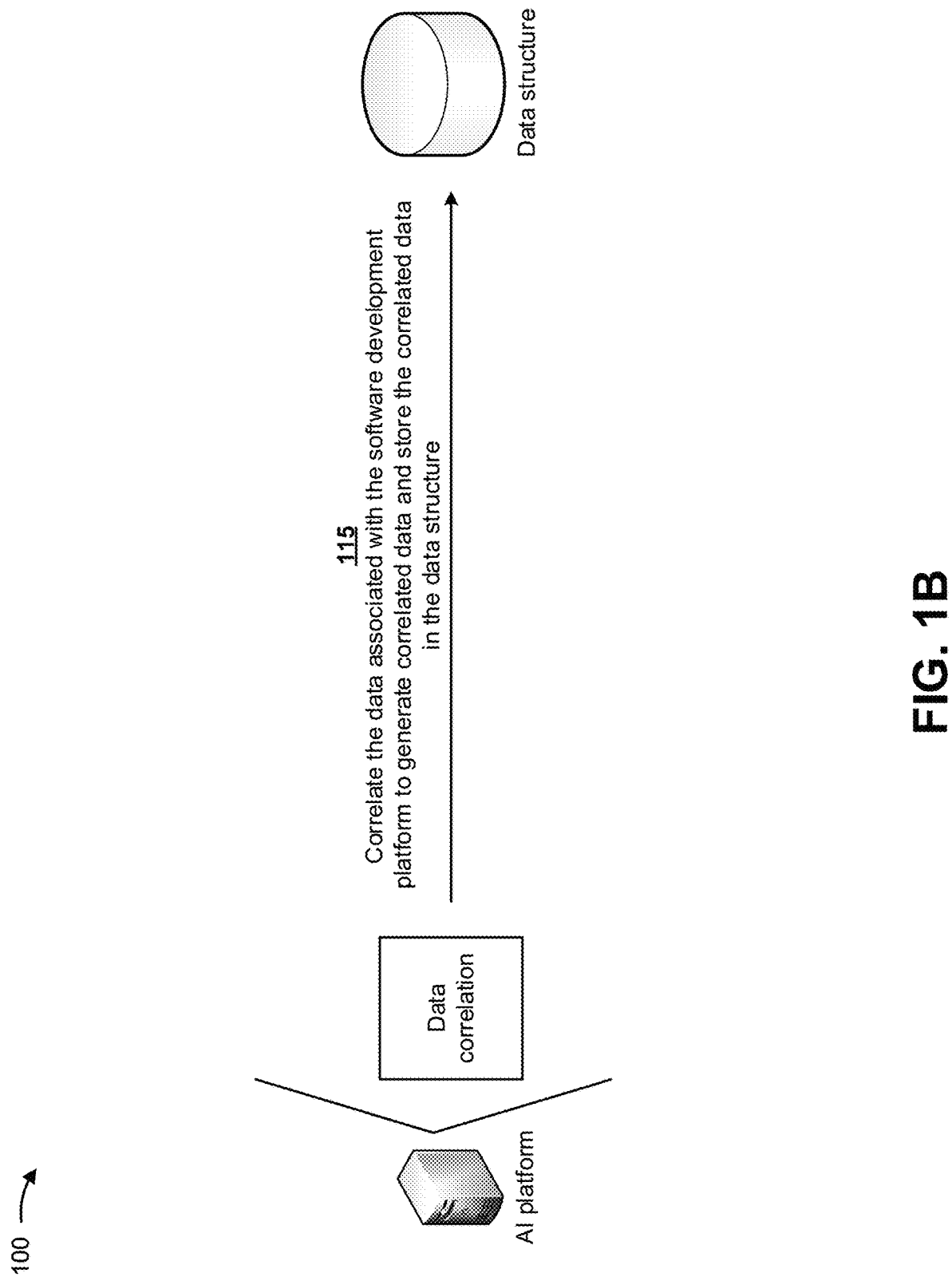

As shown in FIG. 1B, and by reference number 115, the artificial intelligence platform may correlate the data associated with the software development platform to generate correlated data, and may store the correlated data in the data structure. In some implementations, the artificial intelligence platform may transform the data associated with the software development platform from an unstructured format to a structured format that corresponds to the correlated data. For example, the artificial intelligence platform may execute scripts that automatically process the unstructured data stored in the data structure and convert the unstructured data to a common structured data format.

In some implementations, the artificial intelligence platform may generate the correlated data in near real time relative to receiving the data associated with a software development platform. For example, the software development tools may be deployed on a continuous basis, and the artificial intelligence platform may receive the data associated with the software development platform from the software development tools on a continual basis, may correlate the data in near real time, and may store the correlated data in the data structure in near real time relative to receipt of the data associated with the software development platform. In some implementations, the artificial intelligence platform may continuously receive and/or correlate the data associated with the software development platform, may periodically receive and/or correlate the data associated with the software development platform, and/or the like. In some implementations, there may be thousands, millions, billions, and/or the like, of data points provided in the data structure associated with the software development platform. In this way, the artificial intelligence platform may handle thousands, millions, billions, and/or the like, of data points within a period of time (e.g., daily, weekly, monthly), and thus may provide "big data" capability.

Figure 1C:
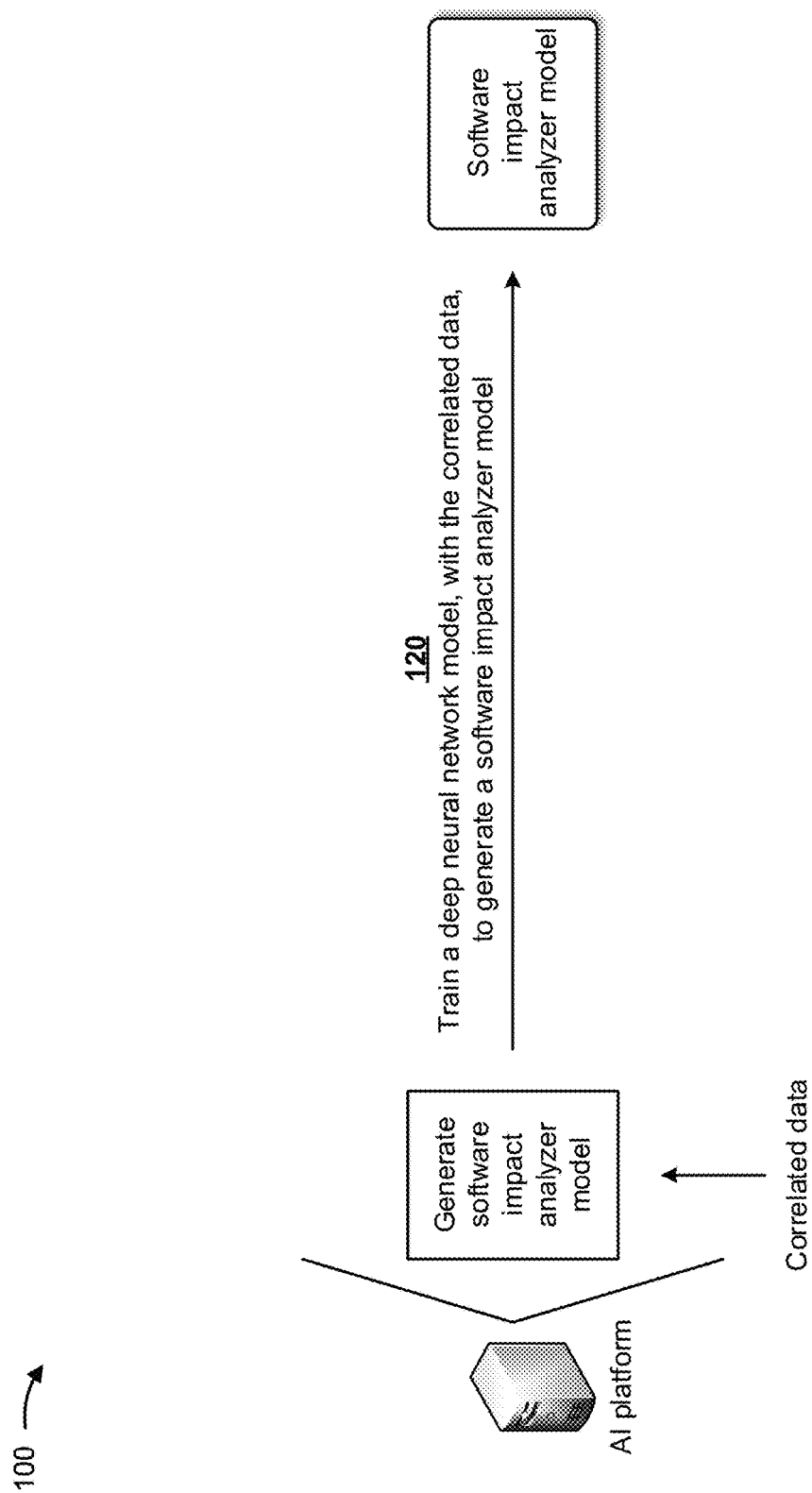

As shown in FIG. 1C, and by reference number 120, the artificial intelligence platform may train a deep neural network model, with the correlated data, to generate a software impact analyzer model. In some implementations, the software impact analyzer model may include a long short-term memory (LSTM) model that utilizes natural language processing techniques. The software impact analyzer model may be utilized by the artificial intelligence platform to process data identifying a new software requirement or a defect in order to identify a file and/or a module impacted by the new software requirement or the defect, as described below.

In some implementations, the artificial intelligence platform may obtain requirements text from the correlated data, and may apply a terminology learning process to the requirements text to learn terminologies associated with different software development tools. For example, the terminology learning process may build an abbreviation annotator that learns patterns in the requirements text, may identify terms that are not in a dictionary, may use the abbreviation annotator to expand the terms, may add terms to a terms file if the added terms are not ambiguous, and/or the like. The artificial intelligence platform may apply natural language processing to the requirements text (e.g., tokenization, stop words, lower case, stemming, and/or the like), may expand terms using the terms file, may apply a term frequency-inverse document frequency (TF-IDF) calculation to eliminate terms of low importance, and/or the like. The artificial intelligence platform may apply a recurrent neural network (RNN) process to perform word embedding, may build an LSTM RNN model to learn patterns associated with a new software requirement or a defect, may build a second RNN model to predict files and/or modules impacted by a new software requirement or a defect, and/or the like.

The artificial intelligence platform may separate the correlated data into a training set, a validation set, a test set, and/or the like. The training set may be utilized to train the deep neural network model. The validation set may be utilized to validate results of the trained deep neural network model (e.g., the software impact analyzer model). The test set may be utilized to test operation of the software impact analyzer model.

In some implementations, the artificial intelligence platform may train the deep neural network model using, for example, an unsupervised training procedure and based on the correlated data. For example, the artificial intelligence platform may perform dimensionality reduction to reduce the correlated data to a minimum feature set, thereby reducing resources (e.g., processing resources, memory resources, and/or the like) to train the deep neural network, and may apply a classification technique to the minimum feature set.

In some implementations, the artificial intelligence platform may use a logistic regression classification technique to determine a categorical outcome (e.g., a prediction of a file and/or a module impacted by a new software requirement or a defect). Additionally, or alternatively, the artificial intelligence platform may use a naïve Bayesian classifier technique. In this case, the artificial intelligence platform may perform binary recursive partitioning to split the correlated data into partitions and/or branches, and use the partitions and/or branches to determine outcomes (e.g., predictions of files and/or modules impacted by new software requirements or defects). Based on using recursive partitioning, the artificial intelligence platform may reduce utilization of computing resources relative to manual, linear sorting and analysis of data points, thereby enabling use of thousands, millions, or billions of data points to train the deep neural network model, which may result in more accurate models than using fewer data points.

Additionally, or alternatively, the artificial intelligence platform may use a support vector machine (SVM) classifier technique to generate a non-linear boundary between data points in the training set. In this case, the non-linear boundary is used to classify test data into a particular class.

Additionally, or alternatively, the artificial intelligence platform may train the deep neural network model using a supervised training procedure that includes receiving input to the deep neural network model from a subject matter expert, which may reduce an amount of time, an amount of processing resources, and/or the like to train the deep neural network model relative to an unsupervised training procedure. In some implementations, the artificial intelligence platform may use one or more other model training techniques, such as a neural network technique, a latent semantic indexing technique, and/or the like. For example, the artificial intelligence platform may perform an artificial neural network processing technique (e.g., using a two-layer feedforward neural network architecture, a three-layer feedforward neural network architecture, and/or the like) to perform pattern recognition with regard to patterns of the correlated data. In this case, using the artificial neural network processing technique may improve an accuracy of the trained deep neural network model (e.g., the software impact analyzer model) generated by the artificial intelligence platform by making the model more robust to noisy, imprecise, or incomplete data, and by enabling the artificial intelligence platform to detect patterns and/or trends undetectable to human analysts or systems using less complex techniques.

Figure 1D:
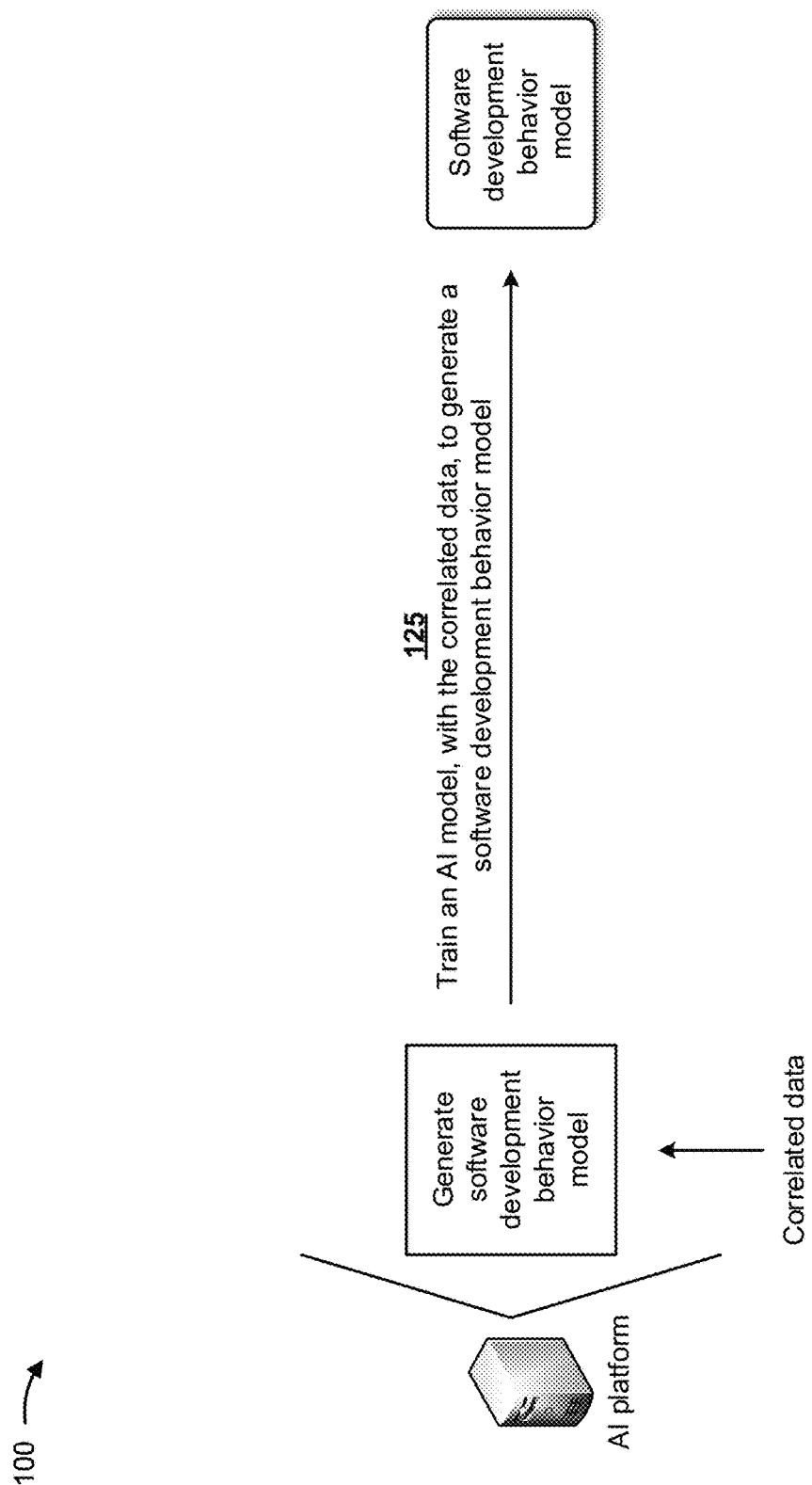

As shown in FIG. 1D, and by reference number 125, the artificial intelligence platform may train an artificial intelligence model, with the correlated data, to generate a software development behavior model. In some implementations, the software development behavior model may include a baseline vector model, a distance measures based rewards and penalty model, and/or the like. The software development behavior model may be utilized by the artificial intelligence platform to process data identifying the file and/or the module impacted by the new software requirement or the defect in order to identify a developer to handle the new software requirement or the defect, as described below.

In some implementations, the artificial intelligence platform may create a baseline vector model corresponding to a baseline vector that represents software development behavior for each of multiple files and/or modules associated with the correlated data. The baseline vector may have a quantity (n) of dimensions corresponding to a quantity (n) of software development behavior attributes. The software development behavior attributes may include software build attributes (e.g., build check-in, build successes, build failures, errors, warnings, and/or the like) for each developer during each build; code quality attributes (e.g., total quantity of violations, blocker violations, vulnerabilities, bugs, code smells, and/or the like) for each developer during each check-in; defect quality attributes (e.g., total quantity of defects, priorities of the defects introduced, and/or the like). The baseline vector may correspond to an ideal vector space, for the quantity (n) of dimensions, that maximizes positive scenarios (e.g., more build successes, more check-ins, and/or the like) and penalizes negative scenarios (e.g., more failures, bugs, blocker violations, and/or the like).

In some implementations, the artificial intelligence platform may create a distance measures based rewards and penalty model. For each of the multiple files and/or modules associated with the correlated data, the artificial intelligence platform may create a developer vector for each developer that has a behavioral history associated with that file and/or module. The developer vector may include a quantity (n) of dimensions corresponding to a same quantity (n) of software development behavior attributes as the baseline vector. The distance measures based rewards and penalty model may calculate a score, for each developer with respect to each file and/or module, that rewards developers associated with a developer vector that is close (e.g., as determined by a Euclidean distance) to the baseline vector associated with the file and/or module, and penalizes developers associated with a developer vector that is far (e.g., as determined by the Euclidean distance) from the baseline vector associated with the file and/or module. The artificial intelligence platform may identify the developer associated with a lowest score (e.g., based on a closest Euclidean distance) as the developer to handle the new software requirement or the defect.

In some implementations, the artificial intelligence platform may utilize the techniques, described above in connection with FIG. 1C, to train the artificial intelligence model and generate the software development behavior model.

Figure 1E:
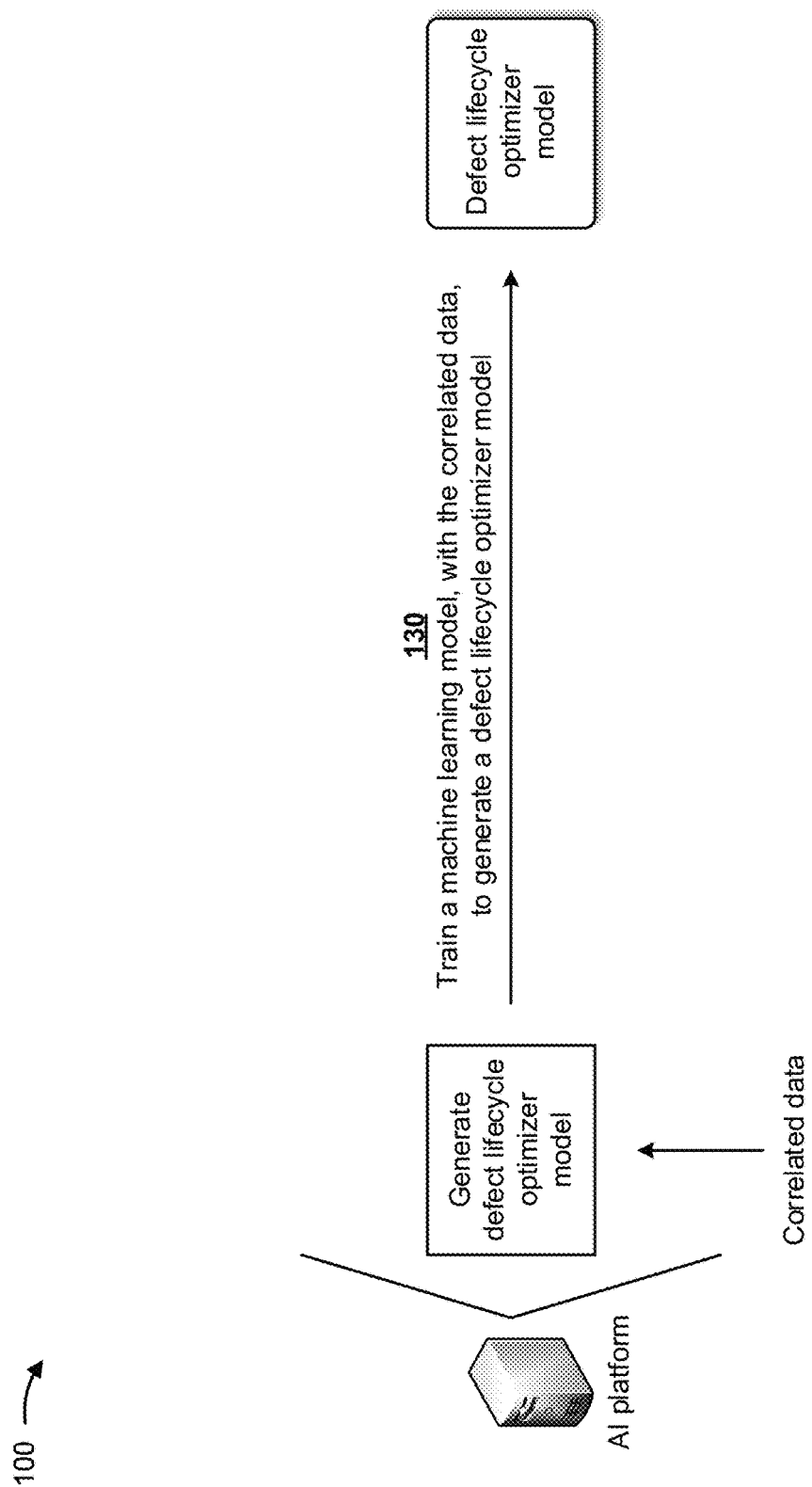

As shown in FIG. 1E, and by reference number 130, the artificial intelligence platform may train a machine learning model, with the correlated data, to generate a defect lifecycle optimizer model. In some implementations, the defect lifecycle optimizer model may include a combination of one or more of a random forest model, a naive Bayes model, a logistic regression model, a k-nearest neighbors model, a support vector machine model, a decision tree model, a deep recurrent neural network model, and/or the like. The trained defect lifecycle optimizer model may be utilized by the artificial intelligence platform to process data identifying a defect in order to identify duplicates of the defect, a correction to the defect, and/or a developer to implement the correction to the defect, as described below.

In some implementations, the defect lifecycle optimizer model may include a de-duplication portion that uses deep architectures to calculate similarity measures of historical defects compared to new defects. The artificial intelligence platform may generate the de-duplication portion by obtaining historical defect data, vectorizing requirements text using natural language processing techniques (e.g., Word2vec, Sent2vec, and/or the like), preprocessing the defect data using natural language processing, applying a spell check technique to clean up text, and applying a process to handle customer-specific and/or application-specific abbreviations.

In some implementations, the defect lifecycle optimizer model may include a triaging prediction portion that associates a defect with an appropriate person or team (e.g., a triaging team) to handle the defect. The artificial intelligence platform may generate the triaging prediction portion by obtaining historical defect data, vectorizing requirements text using natural language processing techniques (e.g., Word2vec, Sent2vec, and/or the like), preprocessing the defect data using natural language processing, applying a spell check technique to clean up the text, and generating the triaging prediction portion based on an ensemble of models (e.g., a random forest model, a naive Bayes model, a logistic regression model, a k-nearest neighbors model, a support vector machine model, a decision tree model, a deep recurrent neural network model, and/or the like) to use a subject, a description, work notes, and/or the like associated with a defect so that the defect can be classified and assigned to an appropriate person or team.

In some implementations, the artificial intelligence platform may utilize the techniques described above, in connection with FIG. 1E, to train the machine learning model and generate the defect lifecycle optimizer model. In some implementations, rather than training the machine learning model, the artificial intelligence platform may obtain the defect lifecycle optimizer model from another system or device that trained the machine learning model to generate the defect lifecycle optimizer model. In this case, the artificial intelligence platform may provide the other system or device with the correlated data for use in training the machine learning model, and may provide the other system or device with updated correlated data to retrain the machine learning model in order to update the defect lifecycle optimizer model.

Figure 1F:
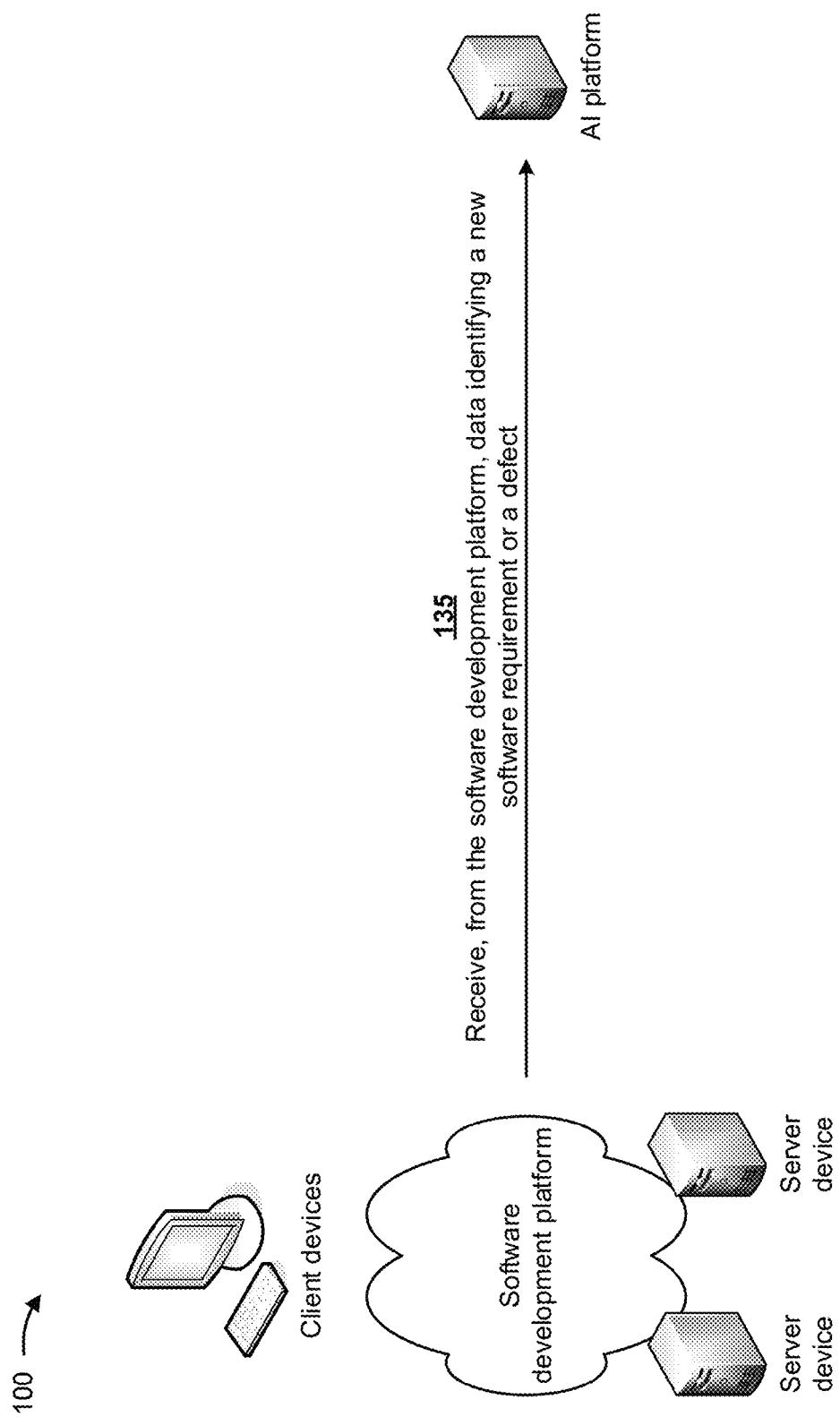

As shown in FIG. 1F, and by reference number 135, the artificial intelligence platform may receive, from the software development platform, data identifying a new software requirement or a defect associated with the software development platform. For example, the data identifying a new software requirement may include data identifying customer requirements, architectural requirements, structural requirements, behavioral requirements, functional requirements, performance requirements, design requirements, and/or the like associated with software from the software development platform. The data identifying a defect may include data identifying errors, bugs, failures, faults, vulnerabilities, flaws, and/or the like associated with software from the software development platform.

Figure 1G:
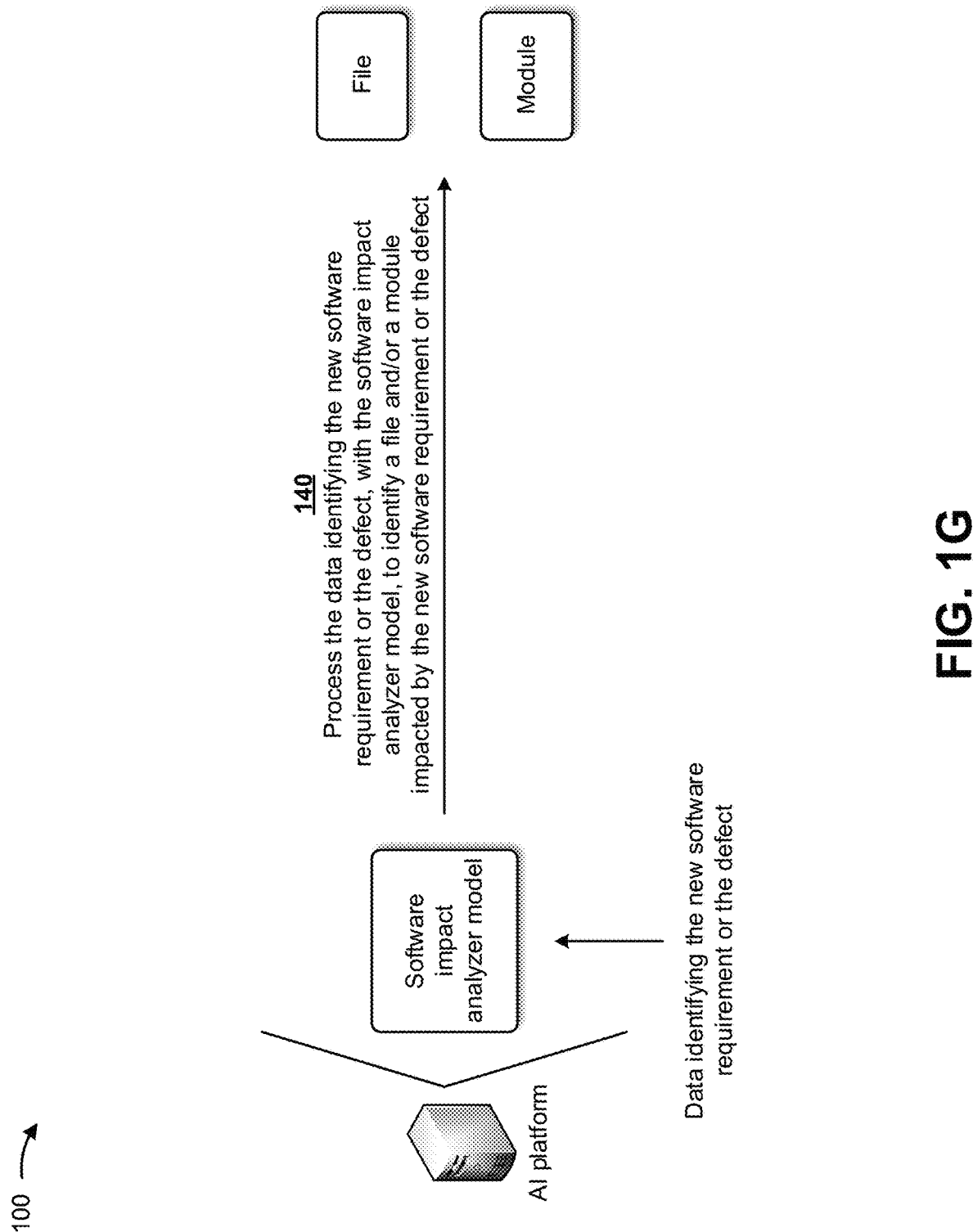

As shown in FIG. 1G, and by reference number 140, the artificial intelligence platform may process the data identifying the new software requirement or the defect, with the software impact analyzer model, to identify a file or a module impacted by the new software requirement or the defect. For example, the software impact analyzer model may predict one or more files and/or one or more modules, of software associated with the software development platform, that may be impacted by the new software requirement or the defect. In some implementations, the software impact analyzer model may predict a service, provided by the software development platform, that may be impacted by the new software requirement or the defect. In some implementations, the software impact analyzer model may predict probabilities for the one or more files and/or one or more modules that may be impacted by the new software requirement or the defect, and may output data identifying files and/or modules associated with probabilities that satisfy a probability threshold.

Figure 1H:
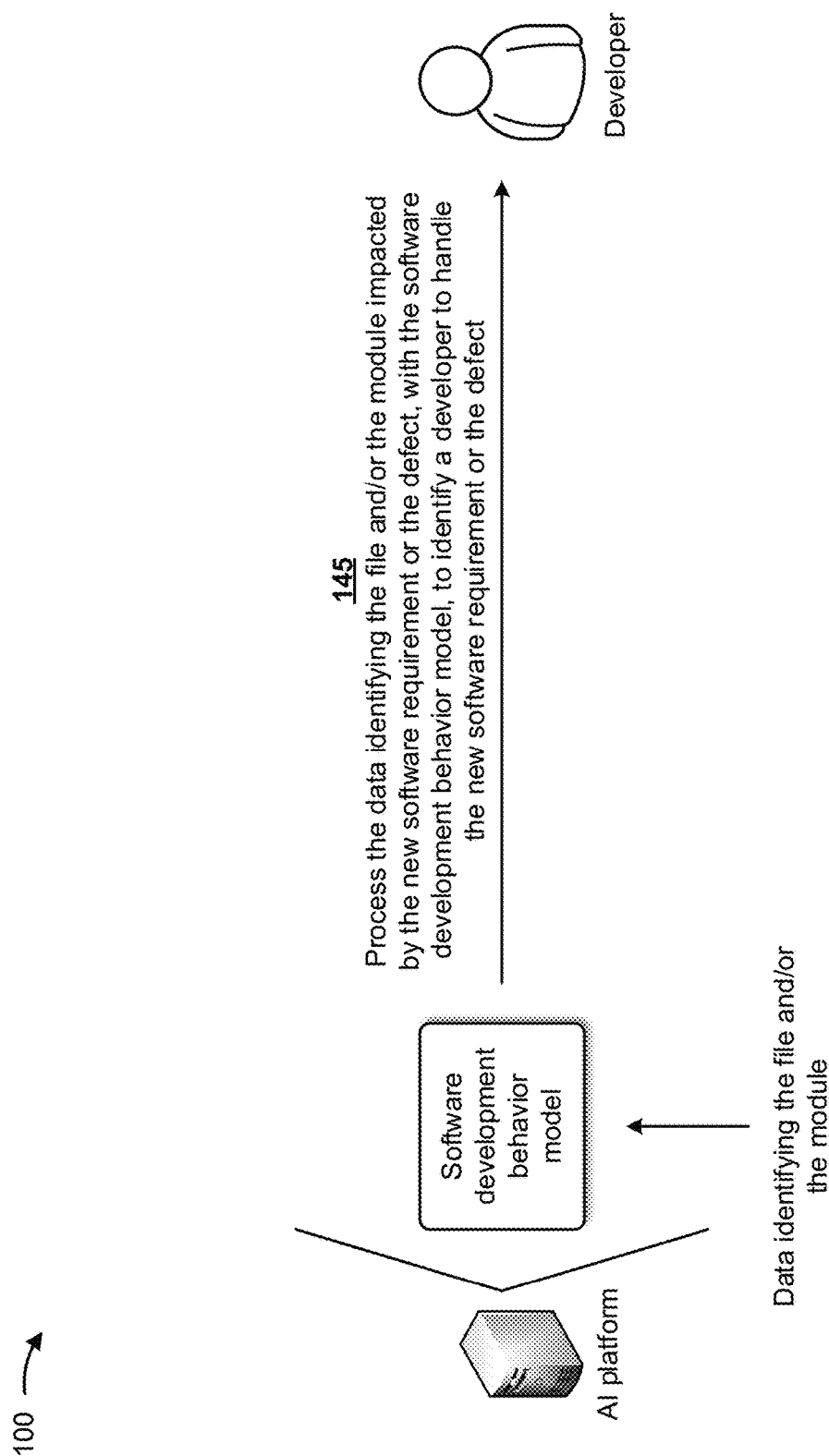

As shown in FIG. 1H, and by reference number 145, the artificial intelligence platform may process data identifying the file and/or the module impacted by the new software requirement or the defect, with the software development behavior model, to identify a developer to handle the new software requirement or the defect. In some implementations, the software development behavior model may identify a plurality of developers that may handle the new software requirement or the defect, and may assign scores to each of the plurality of developers (e.g., based on baseline vector distances associated with the plurality of developers, as described above). The software development behavior model may identify a developer, of the plurality of developers, associated with a lowest score (e.g., based on a lowest baseline vector distance) as the developer to handle the new software requirement or the defect.

In some implementations, the artificial intelligence platform may provide a chat bot to communicate with the developer identified to handle the new software requirement or the defect. For example, the artificial intelligence platform may create (e.g., using natural language processing) a virtual assistant that may understand developer terminologies, and that may assist the developer in handling the new software requirement or the defect (e.g., by instructing the developer on how to install the new software requirement, how to correct the defect, and/or the like).

Figure 1I:
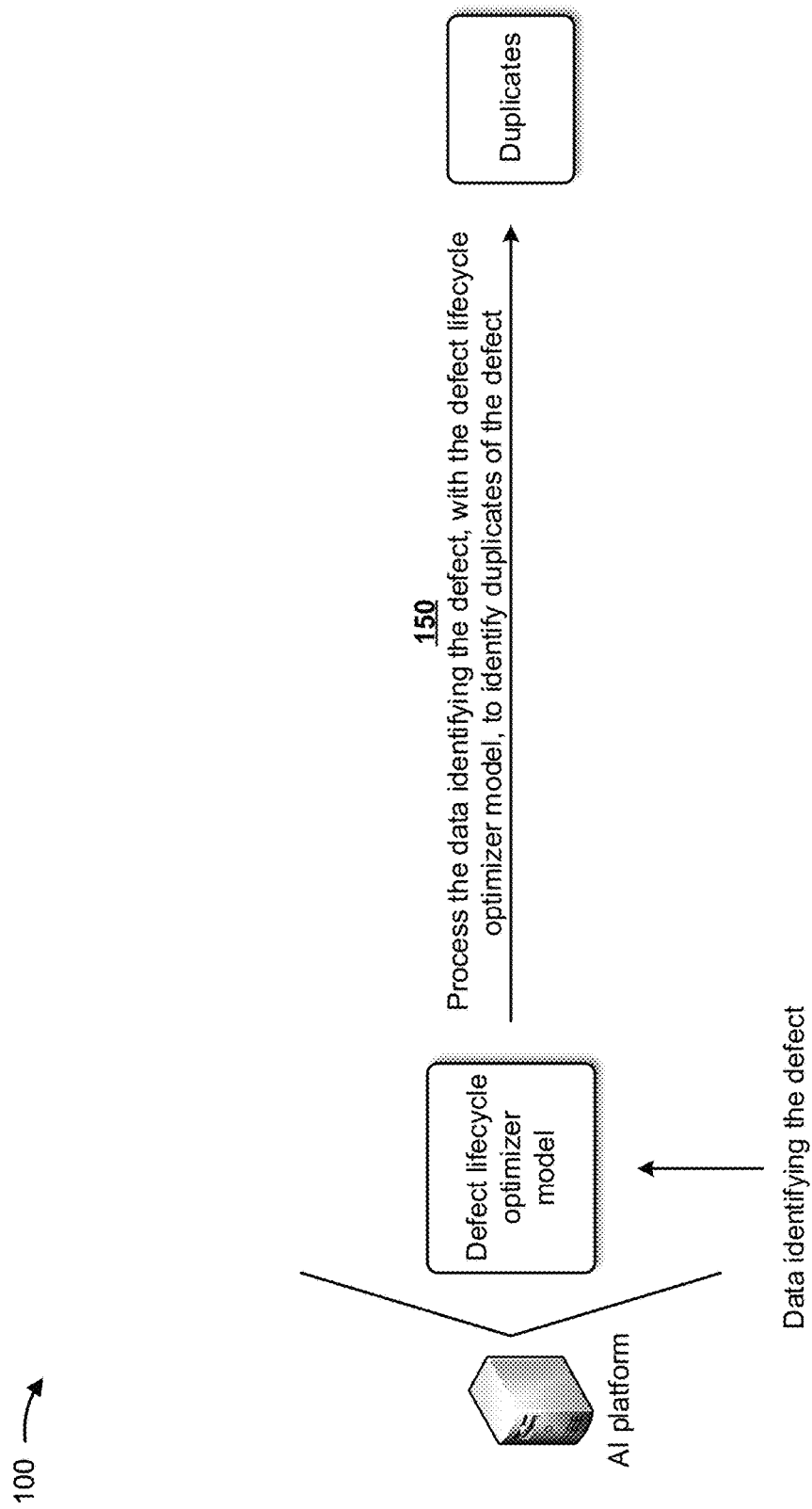

As shown in FIG. 1I, and by reference number 150, the artificial intelligence platform may process the data identifying the defect, with the defect lifecycle optimizer model, to identify duplicates of the defect. In some implementations, the defect lifecycle optimizer model may compare information describing the defect and information describing existing defects, and may identify existing defects as duplicates of the defect when the information describing existing defects matches the information describing the defect that satisfies a threshold matching threshold. In some implementations, the artificial intelligence platform may automatically cause the duplicates of the defect to be eliminated from the software development platform. For example, the artificial intelligence platform may instruct a device associated with the software development platform to remove the duplicates of the defect, and the device may remove the duplicates of the defect from the software development platform based on the instruction.

Figure 1J:
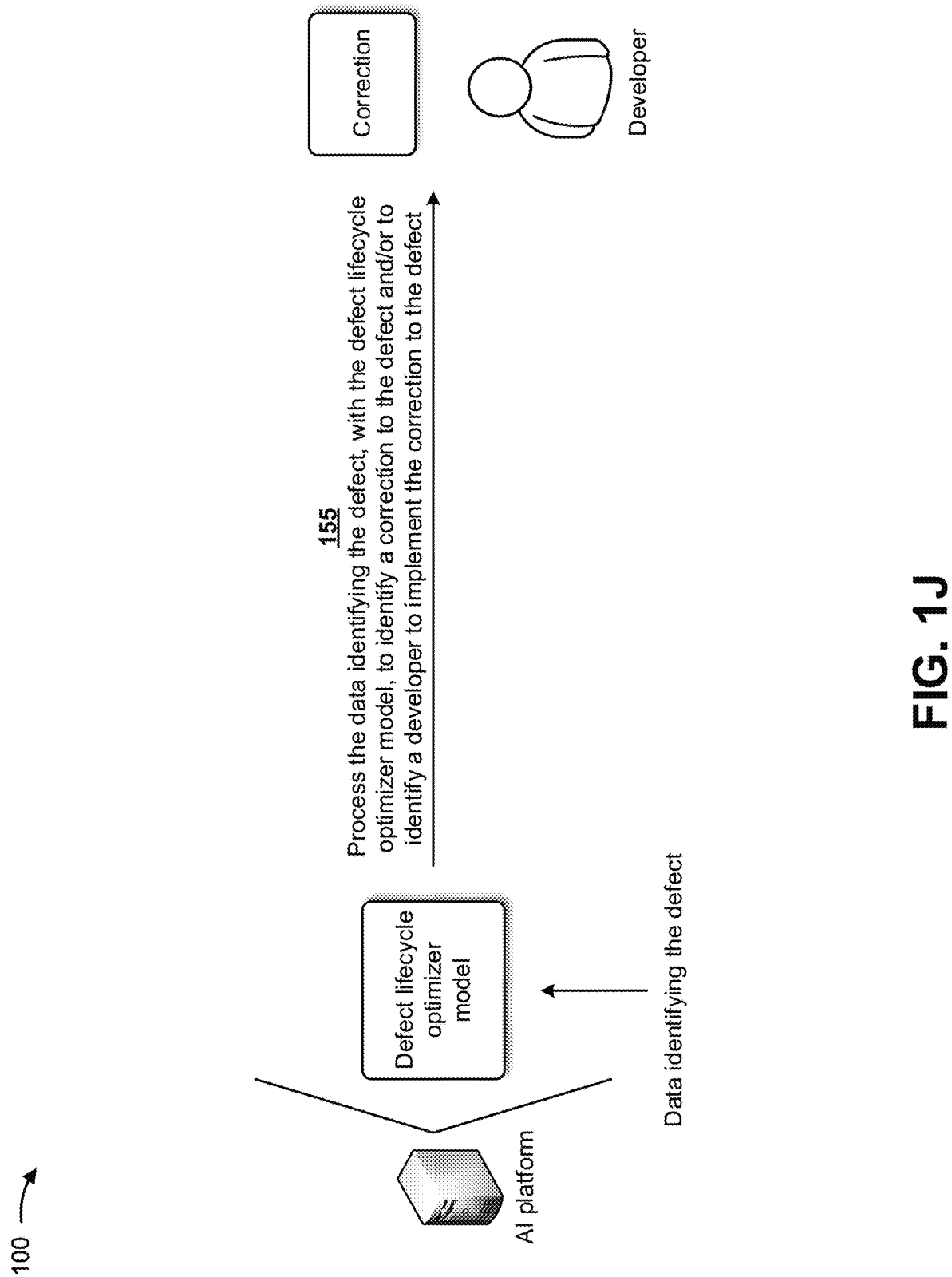

As shown in FIG. 1J, and by reference number 155, the artificial intelligence platform may process the data identifying the defect, with the defect lifecycle optimizer model, to identify a correction to the defect and/or to identify a developer to implement the correction to the defect. In some implementations, if the correction to the defect cannot be determined, the artificial intelligence platform may identify a developer to handle the defect (e.g., the developer identified to handle implementation of the correction) and may request that the developer determine and implement a correction to the defect. In some implementations, the artificial intelligence platform may automatically cause the correction to the defect to be implemented in the software development platform, without the aid of the developer. For example, the artificial intelligence platform may instruct a device associated with the software development platform to implement the correction to the defect, and the device may implement the correction to the defect based on the instruction.

Figure 1K:
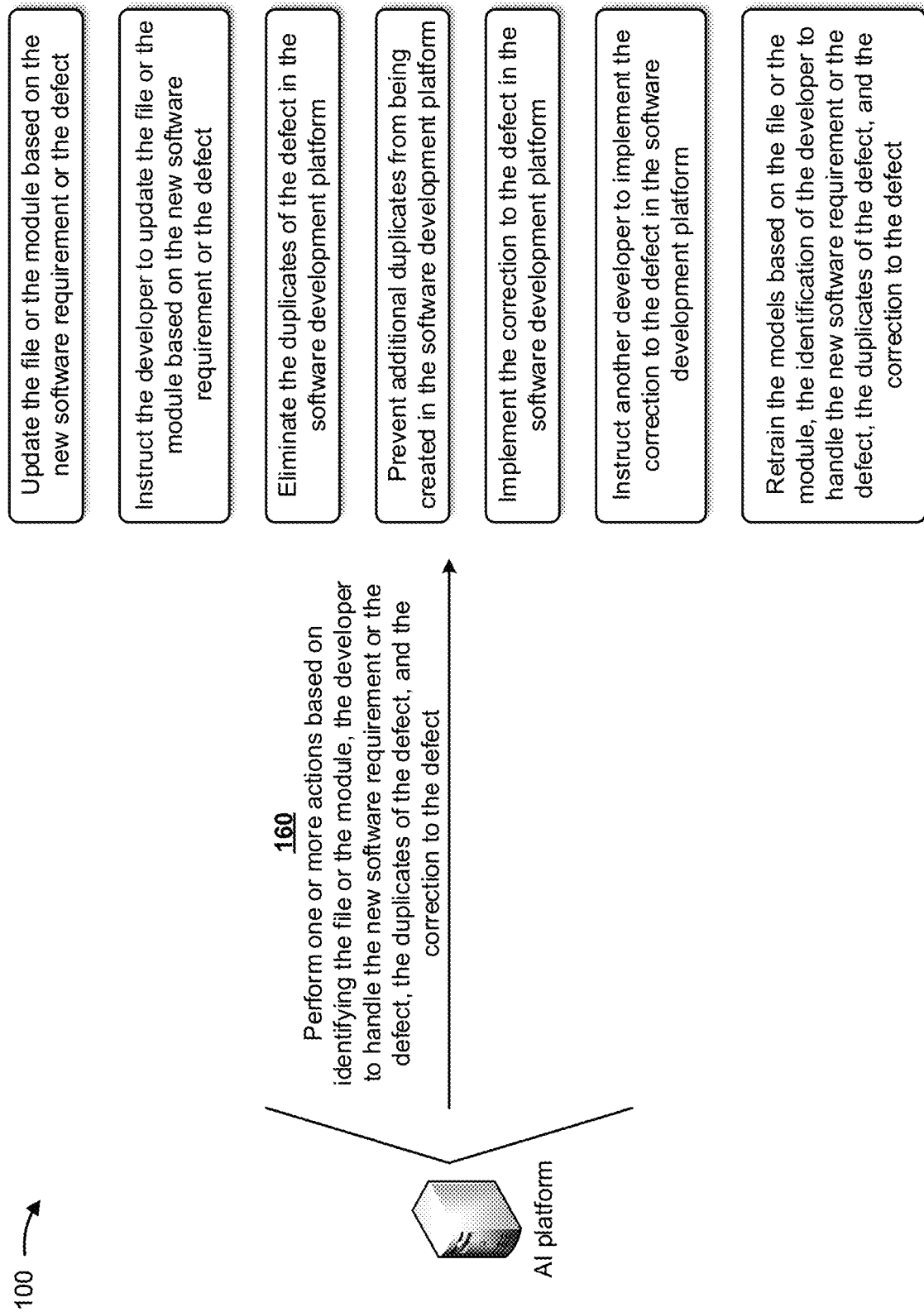

As shown in FIG. 1K, and by reference number 160, the artificial intelligence platform may perform one or more actions based on identifying the file or the module, the developer to handle the new software requirement or the defect, the duplicates of the defect, the correction to the defect, and/or the like. In some implementations, the one or more actions may include the artificial intelligence platform updating the file or the module or causing the file or the module to be updated based on the new software requirement or the defect. In this way, the artificial intelligence platform may eliminate the need for the file or module to be updated manually and/or identified by the software development platform, thereby conserving resources associated with the software development platform.

In some implementations, the one or more actions may include the artificial intelligence platform instructing a developer to update the file or the module based on the new software requirement or the defect. In this way, the artificial intelligence platform may select an appropriate developer to update the file or the module, which may ensure that the update is handled correctly and that resources of the software development platform are not wasted incorrectly handling the update.

In some implementations, the one or more actions may include the artificial intelligence platform eliminating the duplicates of the defect in the software development platform. In this way, the artificial intelligence platform may prevent the duplicates of the defect from being processed and causing errors in the software development platform, thereby conserving resources associated with the software development platform.

In some implementations, the one or more actions may include the artificial intelligence platform preventing additional duplicates from being created in the software development platform. In this way, the artificial intelligence platform may prevent the additional duplicates of the defect from being processed and causing errors in the software development platform, thereby conserving resources associated with the software development platform.

In some implementations, the one or more actions may include the artificial intelligence platform implementing the correction to the defect in the software development platform. In this way, the artificial intelligence platform may eliminate the need for the defect to be corrected manually and may prevent the defect from causing errors, thereby conserving resources associated with the software development platform.

In some implementations, the one or more actions may include the artificial intelligence platform instructing another developer to implement the correction to the defect in the software development platform. In this way, the artificial intelligence platform may correct the defect and prevent the defect from being processed and causing errors in the software development platform, thereby conserving resources associated with the software development platform.

In some implementations, the one or more actions may include the artificial intelligence platform retraining one or more of the models based on the file or the module, the identification of the developer to handle the new software requirement or the defect, the duplicates of the defect, the correction to the defect, and/or the like. In this way, the artificial intelligence platform may automatically continue to improve the accuracy and effectiveness of the models, thereby improving identification of files and/or modules impacted by new software requirements or defects, improving identification of developers to handle new software requirements or defects, and/or improving identification of duplicates of defects.

In this way, unstructured data associated with a software development platform may be captured and correlated into structured data in near real time, and the structured data may be stored in a data structure that can be utilized by models (e.g., a software impact analyzer model, a software development behavior model, a defect lifecycle optimizer model, and/or the like) to automate and improve software development functions. The software impact analyzer model may predict files and/or modules impacted by new software requirements or defects, which greatly reduces a need for manual efforts of software developers. The software development behavior model may intelligently recommend a software developer to handle the new software requirements or defects, which reduces critical manual efforts of software developers and reduces time spent by software developers checking for assigned activities. The defect lifecycle optimizer model may identify duplicate issues, which greatly reduces the need for manual efforts to identify such issues, and may triage such issues and automatically assign the issues to a most appropriate team, which greatly reduces manual effort that would otherwise be required by triage teams.

Furthermore, several different stages of the process for improving productivity of software development and information technology operations may be automated via models, which may improve speed and efficiency of the process and conserve computing resources (e.g., processing resources, memory resources, and/or the like). Implementations described herein use a rigorous, computerized process to perform tasks or roles that were not previously performed. For example, currently there does not exist a technique that utilizes artificial intelligence to improve productivity of software development and information technology operations. Further, the process for utilizing artificial intelligence to improve productivity of software development and information technology operations conserves resources (e.g., processing resources, memory resources, network resources, and/or the like) that would otherwise be wasted inefficiently utilizing tools of a software development platform, selecting software developers to handle new software requirements and/or defects, identifying corrections for defects, and/or like.

As indicated above, FIGS. 1A-1K are provided merely as examples. Other examples may differ from what is described with regard to FIGS. 1A-1K.

Figure 2:
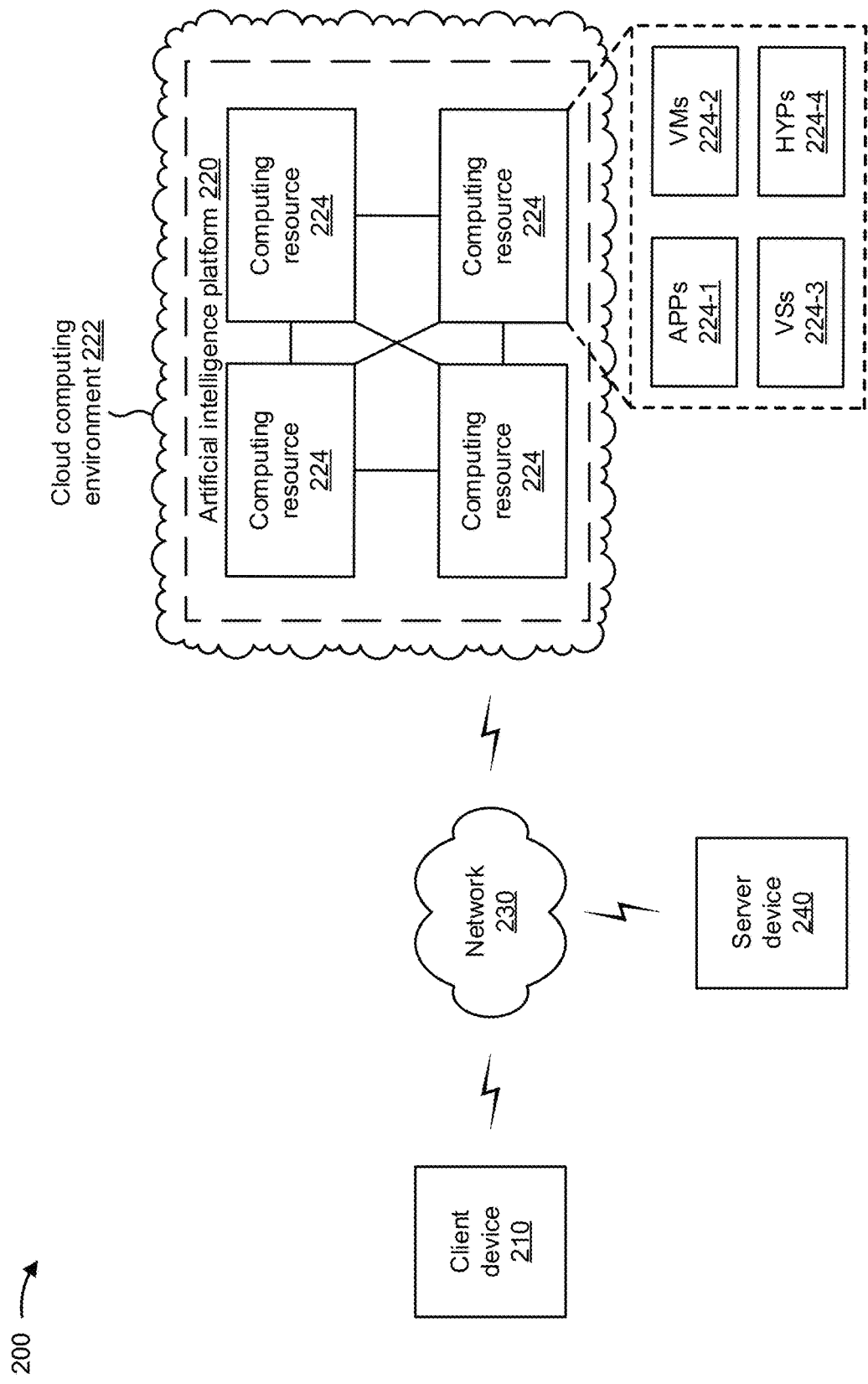
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an artificial intelligence platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to artificial intelligence platform 220 and/or server device 240.

Artificial intelligence platform 220 includes one or more devices that utilize artificial intelligence to improve productivity of software development and information technology operations. In some implementations, artificial intelligence platform 220 may be designed to be modular such that certain software components may be swapped in or out depending on a particular need. As such, artificial intelligence platform 220 may be easily and/or quickly reconfigured for different uses. In some implementations, artificial intelligence platform 220 may receive information from and/or transmit information to one or more client devices 210 and/or server devices 240.

In some implementations, as shown, artificial intelligence platform 220 may be hosted in a cloud computing environment 222. Notably, while implementations described herein describe artificial intelligence platform 220 as being hosted in cloud computing environment 222, in some implementations, artificial intelligence platform 220 may not be cloud-based (i.e., may be implemented outside of a cloud computing environment) or may be partially cloud-based.

Cloud computing environment 222 includes an environment that hosts artificial intelligence platform 220. Cloud computing environment 222 may provide computation, software, data access, storage, etc., services that do not require end-user knowledge of a physical location and configuration of system(s) and/or device(s) that hosts artificial intelligence platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host artificial intelligence platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with artificial intelligence platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 and/or server device 240 or an operator of artificial intelligence platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with an entity as described above. In some implementations, server device 240 may receive information from and/or transmit information to client device 210 and/or artificial intelligence platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
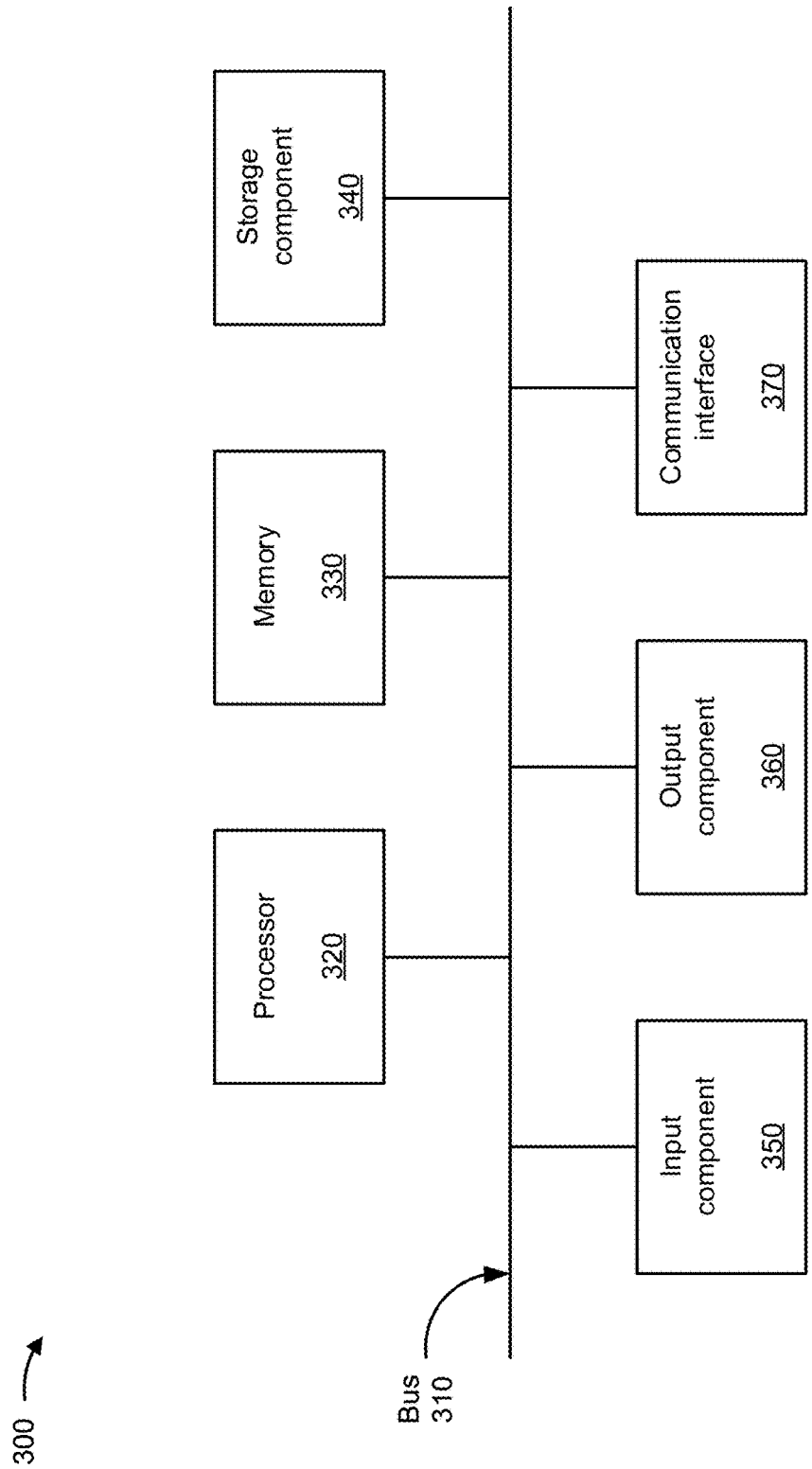
FIG. 3 is a diagram of example components of one or more devices of FIG. 2.

FIG. 3 is a diagram of example components of a device 300. Device 300 may correspond to client device 210, artificial intelligence platform 220, computing resource 224, and/or server device 240. In some implementations, client device 210, artificial intelligence platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
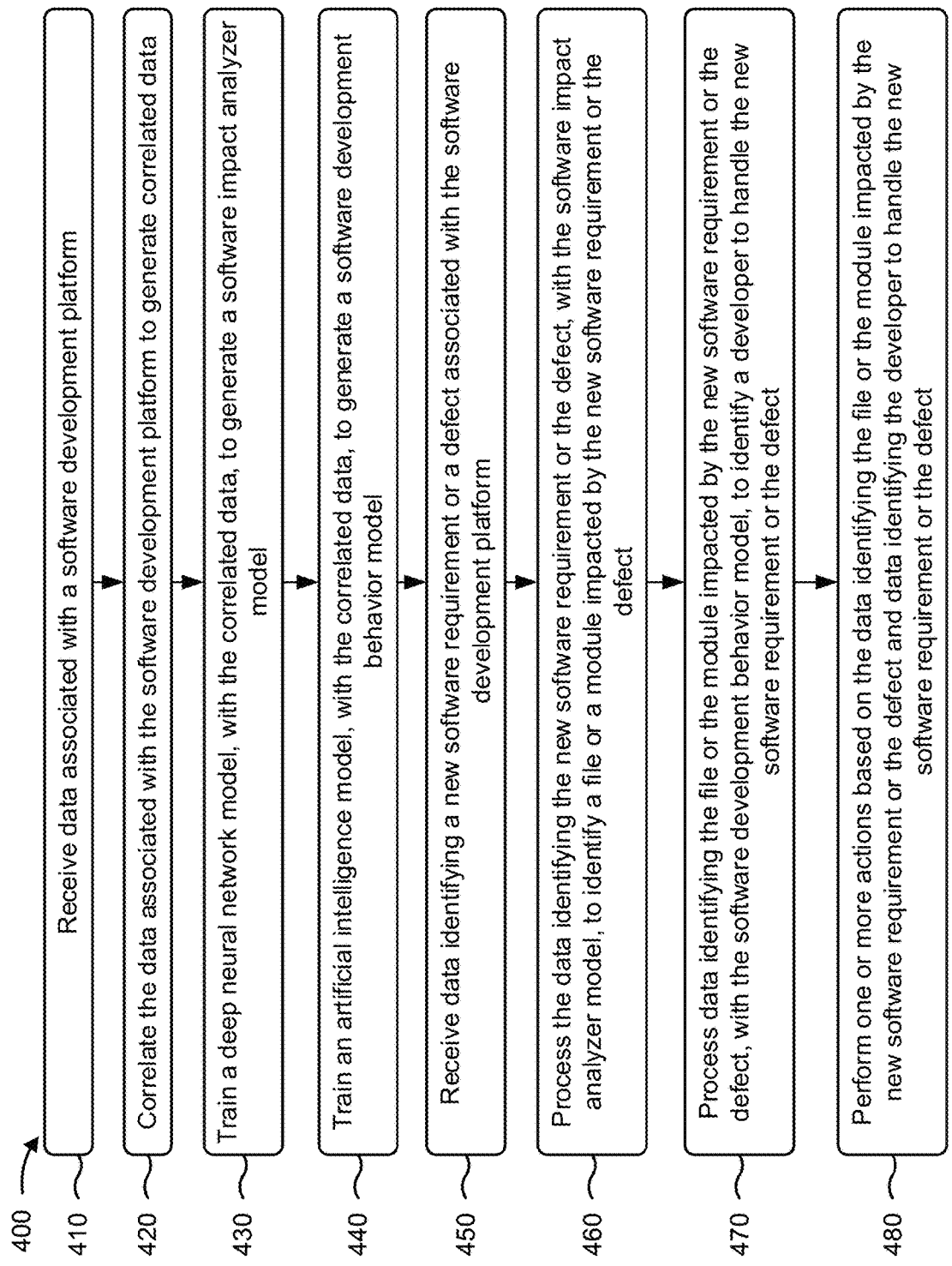

FIG. 4 is a flow chart of an example process 400 for utilizing artificial intelligence to improve productivity of software development and information technology operations. In some implementations, one or more process blocks of FIG. 4 may be performed by an artificial intelligence platform (e.g., artificial intelligence platform 220). In some implementations, one or more process blocks of FIG. 4 may be performed by another device or a group of devices separate from or including the artificial intelligence platform, such as a client device (e.g., client device 210), a server device (e.g., server device 240), and/or the like.

As shown in FIG. 4, process 400 may include receiving data associated with a software development platform (block 410). For example, the artificial intelligence platform (e.g., using computing resource 224, processor 320, communication interface 370, and/or the like) may receive data associated with a software development platform, as described above.

As further shown in FIG. 4, process 400 may include correlating the data associated with the software development platform to generate correlated data (block 420). For example, the artificial intelligence platform (e.g., using computing resource 224, processor 320, memory 330, and/or the like) may correlate the data associated with the software development platform to generate correlated data, as described above.

As further shown in FIG. 4, process 400 may include training a deep neural network model, with the correlated data, to generate a software impact analyzer model (block 430). For example, the artificial intelligence platform (e.g., using computing resource 224, processor 320, storage component 340, and/or the like) may train a deep neural network model, with the correlated data, to generate a software impact analyzer model, as described above.

As further shown in FIG. 4, process 400 may include training an artificial intelligence model, with the correlated data, to generate a software development behavior model (block 440). For example, the artificial intelligence platform (e.g., using computing resource 224, processor 320, memory 330, and/or the like) may train an artificial intelligence model, with the correlated data, to generate a software development behavior model, as described above.

As further shown in FIG. 4, process 400 may include receiving data identifying a new software requirement or a defect associated with the software development platform (block 450). For example, the artificial intelligence platform (e.g., using computing resource 224, processor 320, communication interface 370, and/or the like) may receive data identifying a new software requirement or a defect associated with the software development platform, as described above.

As further shown in FIG. 4, process 400 may include processing the data identifying the new software requirement or the defect, with the software impact analyzer model, to identify a file or a module impacted by the new software requirement or the defect (block 460). For example, the artificial intelligence platform (e.g., using computing resource 224, processor 320, storage component 340, and/or the like) may process the data identifying the new software requirement or the defect, with the software impact analyzer model, to identify a file or a module impacted by the new software requirement or the defect, as described above.

As further shown in FIG. 4, process 400 may include processing data identifying the file or the module impacted by the new software requirement or the defect, with the software development behavior model, to identify a developer to handle the new software requirement or the defect (block 470). For example, the artificial intelligence platform (e.g., using computing resource 224, processor 320, memory 330, and/or the like) may process data identifying the file or the module impacted by the new software requirement or the defect, with the software development behavior model, to identify a developer to handle the new software requirement or the defect, as described above.

As further shown in FIG. 4, process 400 may include performing one or more actions based on the data identifying the file or the module impacted by the new software requirement or the defect and data identifying the developer to handle the new software requirement or the defect (block 480). For example, the artificial intelligence platform (e.g., using computing resource 224, processor 320, memory 330, storage component 340, communication interface 370, and/or the like) may perform one or more actions based on the data identifying the file or the module impacted by the new software requirement or the defect and data identifying the developer to handle the new software requirement or the defect, as described above.

Process 400 may include additional implementations, such as any single implementation or any combination of implementations described below and/or in connection with one or more other processes described elsewhere herein.

In a first implementation, the artificial intelligence platform may train a machine learning model, with the correlated data, to generate a defect lifecycle optimizer model, may process the data identifying the defect, with the defect lifecycle optimizer model, to identify duplicates of the defect, and may cause the duplicates of the defect to be eliminated in the software development platform.

In a second implementation, alone or in combination with the first implementation, the artificial intelligence platform may process the data identifying the defect, with the defect lifecycle optimizer model, to identify a correction to the defect, and may cause the correction to the defect to be implemented in the software development platform.

In a third implementation, alone or in combination with one or more of the first and second implementations, the defect lifecycle optimizer model may include a plurality of a random forest model, a naive Bayes model, a logistic regression model, a k-nearest neighbors model, a support vector machine model, a decision tree model, or a deep recurrent neural network model.

In a fourth implementation, alone or in combination with one or more of the first through third implementations, the data associated with the software development platform may include one or more of data generated by a software coding tool, a software building tool, a software testing tool, a software packaging tool, a software releasing tool, a software configuring tool, or a software monitoring tool associated with the software development platform.

In a fifth implementation, alone or in combination with one or more of the first through fourth implementations, when correlating the data associated with the software development platform to generate the correlated data, the artificial intelligence platform may transform the data associated with the software development platform from an unstructured format to a structured format, where the data associated with the software development platform in the structured format may correspond to the correlated data.

In a sixth implementation, alone or in combination with one or more of the first through fifth implementations, when performing the one or more actions, the artificial intelligence platform may one or more of cause the file or the module to be updated in the software development platform based on the new software requirement or the defect, provide, to the developer, an instruction to update the file or the module in the software development platform based on the new software requirement or the defect, or retrain the software impact analyzer model or the software development behavior model based on the file or the module and data identifying the developer to handle the new software requirement or the defect.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing artificial intelligence to improve productivity of software development and information technology operations. In some implementations, one or more process blocks of FIG. 5 may be performed by an artificial intelligence platform (e.g., artificial intelligence platform 220). In some implementations, one or more process blocks of FIG. 5 may be performed by another device or a group of devices separate from or including the artificial intelligence platform, such as a client device (e.g., client device 210), a server device (e.g., server device 240), and/or the like.

As shown in FIG. 5, process 500 may include receiving data associated with a software development platform (block 505). For example, the artificial intelligence platform (e.g., using computing resource 224, processor 320, communication interface 370, and/or the like) may receive data associated with a software development platform, as described above.

As further shown in FIG. 5, process 500 may include correlating the data associated with the software development platform to generate correlated data (block 510). For example, the artificial intelligence platform (e.g., using computing resource 224, processor 320, memory 330, and/or the like) may correlate the data associated with the software development platform to generate correlated data, as described above.

As further shown in FIG. 5, process 500 may include training a deep neural network model, with the correlated data, to generate a software impact analyzer model (block 515). For example, the artificial intelligence platform (e.g., using computing resource 224, processor 320, storage component 340, and/or the like) may train a deep neural network model, with the correlated data, to generate a software impact analyzer model, as described above.

As further shown in FIG. 5, process 500 may include training an artificial intelligence model, with the correlated data, to generate a software development behavior model (block 520). For example, the artificial intelligence platform (e.g., using computing resource 224, processor 320, memory 330, and/or the like) may train an artificial intelligence model, with the correlated data, to generate a software development behavior model, as described above.

As further shown in FIG. 5, process 500 may include training a machine learning model, with the correlated data, to generate a defect lifecycle optimizer model (block 525). For example, the artificial intelligence platform (e.g., using computing resource 224, processor 320, storage component 340, and/or the like) may train a machine learning model, with the correlated data, to generate a defect lifecycle optimizer model, as described above.

As further shown in FIG. 5, process 500 may include receiving data identifying a new software requirement or a defect associated with the software development platform (block 530). For example, the artificial intelligence platform (e.g., using computing resource 224, processor 320, communication interface 370, and/or the like) may receive data identifying a new software requirement or a defect associated with the software development platform, as described above.

As further shown in FIG. 5, process 500 may include processing the data identifying the new software requirement or the defect, with the software impact analyzer model, to identify a file or a module impacted by the new software requirement or the defect (block 535). For example, the artificial intelligence platform (e.g., using computing resource 224, processor 320, memory 330, and/or the like) may process the data identifying the new software requirement or the defect, with the software impact analyzer model, to identify a file or a module impacted by the new software requirement or the defect, as described above.

As further shown in FIG. 5, process 500 may include processing data identifying the file or the module impacted by the new software requirement or the defect, with the software development behavior model, to identify a developer to handle the new software requirement or the defect (block 540). For example, the artificial intelligence platform (e.g., using computing resource 224, processor 320, storage component 340, and/or the like) may process data identifying the file or the module impacted by the new software requirement or the defect, with the software development behavior model, to identify a developer to handle the new software requirement or the defect, as described above.

As further shown in FIG. 5, process 500 may include processing the data identifying the defect, with the defect lifecycle optimizer model, to identify duplicates of the defect and a correction to the defect (block 545). For example, the artificial intelligence platform (e.g., using computing resource 224, processor 320, memory 330, and/or the like) may process the data identifying the defect, with the defect lifecycle optimizer model, to identify duplicates of the defect and a correction to the defect, as described above.

As further shown in FIG. 5, process 500 may include performing one or more actions based on data identifying one or more of the file or the module impacted by the new software requirement or the defect, the developer to handle the new software requirement or the defect, the duplicates of the defect, or the correction to the defect (block 550). For example, the artificial intelligence platform (e.g., using computing resource 224, processor 320, memory 330, storage component 340, communication interface 370, and/or the like) may perform one or more actions based on data identifying one or more of the file or the module impacted by the new software requirement or the defect, the developer to handle the new software requirement or the defect, the duplicates of the defect, or the correction to the defect, as described above.

Process 500 may include additional implementations, such as any single implementation or any combination of implementations described below and/or in connection with one or more other processes described elsewhere herein.

In a first implementation, the artificial intelligence platform may store the correlated data in a data structure accessible by the deep neural network model and the artificial intelligence model.

In a second implementation, alone or in combination with the first implementation, the software impact analyzer model may include a long short-term memory (LSTM) model, and a natural language processing model.

In a third implementation, alone or in combination with one or more of the first and second implementations, the software development behavior model may include a baseline vector model, and a distance measures based rewards and penalty model.

In a fourth implementation, alone or in combination with one or more of the first through third implementations, the data associated with a software development platform may be correlated to generate the correlated data in near real time relative to receiving the data associated with a software development platform.

In a fifth implementation, alone or in combination with one or more of the first through fourth implementations, the artificial intelligence platform may provide a chat bot to communicate with the developer identified to handle the new software requirement or the defect.

In a sixth implementation, alone or in combination with one or more of the first through fifth implementations, when performing the one or more actions, the artificial intelligence platform may one or more of cause the file or the module to be updated in the software development platform based on the new software requirement or the defect, provide, to the developer, an instruction to update the file or the module in the software development platform based on the new software requirement or the defect, cause the duplicates of the defect to be eliminated in the software development platform, or cause the correction to the defect to be implemented in the software development platform.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing artificial intelligence to improve productivity of software development and information technology operations. In some implementations, one or more process blocks of FIG. 6 may be performed by an artificial intelligence platform (e.g., artificial intelligence platform 220). In some implementations, one or more process blocks of FIG. 6 may be performed by another device or a group of devices separate from or including the artificial intelligence platform, such as a client device (e.g., client device 210), a server device (e.g., server device 240), and/or the like.

As shown in FIG. 6, process 600 may include receiving data associated with a software development platform (block 610). For example, the artificial intelligence platform (e.g., using computing resource 224, processor 320, communication interface 370, and/or the like) may receive data associated with a software development platform, as described above.

As further shown in FIG. 6, process 600 may include correlating the data associated with the software development platform to generate correlated data (block 620). For example, the artificial intelligence platform (e.g., using computing resource 224, processor 320, memory 330, and/or the like) may correlate the data associated with the software development platform to generate correlated data, as described above.

As further shown in FIG. 6, process 600 may include obtaining a first model that was trained based on the correlated data (block 630). For example, the artificial intelligence platform (e.g., using computing resource 224, processor 320, storage component 340, communication interface 370, and/or the like) may obtain a first model that was trained based on the correlated data, as described above.

As further shown in FIG. 6, process 600 may include obtaining a second model that was trained based on the correlated data (block 640). For example, the artificial intelligence platform (e.g., using computing resource 224, processor 320, memory 330, communication interface 370, and/or the like) may obtain a second model that was trained based on the correlated data, as described above.

As further shown in FIG. 6, process 600 may include receiving data identifying a new software requirement associated with the software development platform (block 650). For example, the artificial intelligence platform (e.g., using computing resource 224, processor 320, communication interface 370, and/or the like) may receive data identifying a new software requirement associated with the software development platform, as described above.

As further shown in FIG. 6, process 600 may include processing the data identifying the new software requirement, with the first model, to identify a file or a module impacted by the new software requirement (block 660). For example, the artificial intelligence platform (e.g., using computing resource 224, processor 320, memory 330, and/or the like) may process the data identifying the new software requirement, with the first model, to identify a file or a module impacted by the new software requirement, as described above.

As further shown in FIG. 6, process 600 may include processing data identifying the file or the module impacted by the new software requirement, with the second model, to identify a developer to handle the new software requirement (block 670). For example, the artificial intelligence platform (e.g., using computing resource 224, processor 320, storage component 340, and/or the like) may process data identifying the file or the module impacted by the new software requirement, with the second model, to identify a developer to handle the new software requirement, as described above.

As further shown in FIG. 6, process 600 may include performing one or more actions based on the data identifying the file or the module impacted by the new software requirement and data identifying the developer to handle the new software requirement (block 680). For example, the artificial intelligence platform (e.g., using computing resource 224, processor 320, memory 330, storage component 340, communication interface 370, and/or the like) may perform one or more actions based on the data identifying the file or the module impacted by the new software requirement and data identifying the developer to handle the new software requirement, as described above.

Process 600 may include additional implementations, such as any single implementation or any combination of implementations described below and/or in connection with one or more other processes described elsewhere herein.

In a first implementation, the artificial intelligence platform may obtain a third model that was trained based on the correlated data, may receive data identifying a defect associated with the software development platform, may process the data identifying the defect, with the third model, to identify duplicates of the defect and a correction to the defect, may cause the duplicates of the defect to be eliminated in the software development platform, and may cause the correction to the defect to be implemented in the software development platform.

In a second implementation, alone or in combination with the first implementation, when correlating the data associated with the software development platform to generate the correlated data, the artificial intelligence platform may transform the data associated with the software development platform from an unstructured format to a structured format, where the data associated with the software development platform in the structured format may correspond to the correlated data.

In a third implementation, alone or in combination with one or more of the first and second implementations, the artificial intelligence platform may store the correlated data in a data structure accessible by the first model and the second model.

In a fourth implementation, alone or in combination with one or more of the first through third implementations, when performing the one or more actions, the artificial intelligence platform may cause the file or the module to be updated in the software development platform based on the new software requirement, may provide, to the developer, an instruction to update the file or the module in the software development platform based on the new software requirement, or may retrain the first model or the second model based on the file or the module and data identifying the developer to handle the new software requirement.

In a fifth implementation, alone or in combination with one or more of the first through fourth implementations, the artificial intelligence platform may provide a chat bot to communicate with the developer identified to handle the new software requirement.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device, data associated with a software development platform;
correlating, by the device, the data associated with the software development platform to generate correlated data;
training, by the device, a deep neural network model, with the correlated data, to generate a software impact analyzer model;
training, by the device, an artificial intelligence model, with the correlated data, to generate a software development behavior model,
wherein the software development behavior model includes:
a baseline vector model,
the baseline vector model having a quantity of dimensions corresponding to a quantity of software development attributes including one or more of:
software build attributes for one or more developers of a plurality of developers, or
defect quality attributes, and
a distance measures based rewards and penalty model,
the distance measure based rewards and penalty model including a developer vector for each developer of the plurality of developers;
receiving, by the device, data identifying a new software requirement or a defect associated with the software development platform;
processing, by the device, the data identifying the new software requirement or the defect, with the software impact analyzer model, to identify a file or a module impacted by the new software requirement or the defect;
processing, by the device, data identifying the file or the module impacted by the new software requirement or the defect, with the software development behavior model, to identify a developer to handle the new software requirement or the defect; and
performing, by the device, one or more actions based on the data identifying the file or the module impacted by the new software requirement or the defect and data identifying the developer to handle the new software requirement or the defect.

2. The method of claim 1, further comprising:
training a machine learning model, with the correlated data, to generate a defect lifecycle optimizer model;
processing the data identifying the defect, with the defect lifecycle optimizer model, to identify duplicates of the defect; and
causing the duplicates of the defect to be eliminated in the software development platform.

3. The method of claim 2, further comprising:
processing the data identifying the defect, with the defect lifecycle optimizer model, to identify a correction to the defect; and
causing the correction to the defect to be implemented in the software development platform.

4. The method of claim 2, wherein the defect lifecycle optimizer model includes a plurality of:
a random forest model,
a naive Bayes model,
a logistic regression model,
a k-nearest neighbors model,
a support vector machine model,
a decision tree model, or
a deep recurrent neural network model.

5. The method of claim 1, wherein the data associated with the software development platform includes one or more of:
data generated by a software coding tool associated with the software development platform,
data generated by a software building tool associated with the software development platform,
data generated by a software testing tool associated with the software development platform,
data generated by a software packaging tool associated with the software development platform,
data generated by a software releasing tool associated with the software development platform,
data generated by a software configuring tool associated with the software development platform, or
data generated by a software monitoring tool associated with the software development platform.

6. The method of claim 1, wherein correlating the data associated with the software development platform to generate the correlated data comprises:
transforming the data associated with the software development platform from an unstructured format to a structured format,
wherein the data associated with the software development platform in the structured format corresponds to the correlated data.

7. The method of claim 1, wherein performing the one or more actions comprises one or more of:
causing the file or the module to be updated in the software development platform based on the new software requirement or the defect;
providing, to the developer, an instruction to update the file or the module in the software development platform based on the new software requirement or the defect; or
retraining the software impact analyzer model or the software development behavior model based on the file or the module and data identifying the developer to handle the new software requirement or the defect.

8. A device, comprising:
one or more memories; and
one or more processors, communicatively coupled to the one or more memories, configured to:
receive data associated with a software development platform;
correlate the data associated with the software development platform to generate correlated data;
train a deep neural network model, with the correlated data, to generate a software impact analyzer model;
train an artificial intelligence model, with the correlated data, to generate a software development behavior model,
wherein the software development behavior model includes:
a baseline vector model,
the baseline vector model having a quantity of dimensions corresponding to a quantity of software development attributes including one or more of:
software build attributes for one or more developers of a plurality of developers, or
defect quality attributes, and
a distance measures based rewards and penalty model,
the distance measure based rewards and penalty model including a developer vector for each developer of the plurality of developers;
train a machine learning model, with the correlated data, to generate a defect lifecycle optimizer model;
receive data identifying a new software requirement or a defect associated with the software development platform;
process the data identifying the new software requirement or the defect, with the software impact analyzer model, to identify a file or a module impacted by the new software requirement or the defect;
process data identifying the file or the module impacted by the new software requirement or the defect, with the software development behavior model, to identify a developer to handle the new software requirement or the defect;
process the data identifying the defect, with the defect lifecycle optimizer model, to identify duplicates of the defect and a correction to the defect; and
perform one or more actions based on data identifying one or more of:
the file or the module impacted by the new software requirement or the defect,
the developer to handle the new software requirement or the defect,
the duplicates of the defect, or
the correction to the defect.

9. The device of claim 8, wherein the one or more processors are further configured to:
store the correlated data in a data structure accessible by the deep neural network model and the artificial intelligence model.

10. The device of claim 8, wherein the software impact analyzer model includes:
a long short-term memory (LSTM) model, and
a natural language processing model.

11. The device of claim 8, wherein the data associated with a software development platform is correlated to generate the correlated data in near real time relative to receiving the data associated with a software development platform.

12. The device of claim 8, wherein the one or more processors are further configured to:
provide a chat bot to communicate with the developer identified to handle the new software requirement or the defect.

13. The device of claim 8, wherein the one or more processors, when performing the one or more actions, are configured to one or more of:
cause the file or the module to be updated in the software development platform based on the new software requirement or the defect;
provide, to the developer, an instruction to update the file or the module in the software development platform based on the new software requirement or the defect;
cause the duplicates of the defect to be eliminated in the software development platform; or
cause the correction to the defect to be implemented in the software development platform.

14. The device of claim 8, wherein the software build attributes include, for each developer during each build, one or more of:
build check-in,
build successes,
build failures,
errors, or
warnings.

15. A non-transitory computer-readable medium storing instructions, the instructions comprising:
one or more instructions that, when executed by one or more processors, cause the one or more processors to:
receive data associated with a software development platform;
correlate the data associated with the software development platform to generate correlated data;
obtain a first model that was trained based on the correlated data;
obtain a second model that was trained based on the correlated data,
wherein the second model includes:
a baseline vector model,
the baseline vector model having a quantity of dimensions corresponding to a quantity of software development attributes including one or more of:
software build attributes for one or more developers of a plurality of developers, or
defect quality attributes, and
a distance measures based rewards and penalty model,
the distance measure based rewards and penalty model including a developer vector for each developer of the plurality of developers;
receive data identifying a new software requirement associated with the software development platform;
process the data identifying the new software requirement, with the first model, to identify a file or a module impacted by the new software requirement;
process data identifying the file or the module impacted by the new software requirement, with the second model, to identify a developer to handle the new software requirement; and
perform one or more actions based on the data identifying the file or the module impacted by the new software requirement and data identifying the developer to handle the new software requirement.

16. The non-transitory computer-readable medium of claim 15, wherein the instructions further comprise:
one or more instructions that, when executed by the one or more processors, cause the one or more processors to:
obtain a third model that was trained based on the correlated data;
receive data identifying a defect associated with the software development platform;
process the data identifying the defect, with the third model, to identify duplicates of the defect and a correction to the defect;
cause the duplicates of the defect to be eliminated in the software development platform; and
cause the correction to the defect to be implemented in the software development platform.

17. The non-transitory computer-readable medium of claim 15, wherein the one or more instructions, that cause the one or more processors to correlate the data associated with the software development platform to generate the correlated data, cause the one or more processors to:
transform the data associated with the software development platform from an unstructured format to a structured format,
wherein the data associated with the software development platform in the structured format corresponds to the correlated data.

18. The non-transitory computer-readable medium of claim 15, wherein the instructions further comprise:
one or more instructions that, when executed by the one or more processors, cause the one or more processors to:
store the correlated data in a data structure accessible by the first model and the second model.

19. The non-transitory computer-readable medium of claim 15, wherein the one or more instructions, that cause the one or more processors to perform the one or more actions, cause the one or more processors to one or more of:
cause the file or the module to be updated in the software development platform based on the new software requirement;
provide, to the developer, an instruction to update the file or the module in the software development platform based on the new software requirement; or
retrain the first model or the second model based on the file or the module and data identifying the developer to handle the new software requirement.

20. The non-transitory computer-readable medium of claim 15, wherein the instructions further comprise:
one or more instructions that, when executed by the one or more processors, cause the one or more processors to:
provide a chat bot to communicate with the developer identified to handle the new software requirement.

* * * * *